US010373512B2

(12) United States Patent
Lan et al.

(10) Patent No.: US 10,373,512 B2
(45) Date of Patent: Aug. 6, 2019

(54) MATHEMATICAL LANGUAGE PROCESSING: AUTOMATIC GRADING AND FEEDBACK FOR OPEN RESPONSE MATHEMATICAL QUESTIONS

(71) Applicant: WILLIAM MARSH RICE UNIVERSITY, Houston, TX (US)

(72) Inventors: Shiting Lan, Houston, TX (US); Divyanshu Vats, Houston, TX (US); Andrew E. Waters, Sugar Land, TX (US); Richard G. Baraniuk, Houston, TX (US)

(73) Assignee: William Marsh Rice University, Houston, TX (US)

( * ) Notice: Subject to any disclaimer, the term of this patent is extended or adjusted under 35 U.S.C. 154(b) by 626 days.

(21) Appl. No.: 14/967,131

(22) Filed: Dec. 11, 2015

(65) Prior Publication Data

US 2016/0171902 A1 Jun. 16, 2016

Related U.S. Application Data

(60) Provisional application No. 62/091,342, filed on Dec. 12, 2014.

(51) Int. Cl.
*G09B 7/04* (2006.01)
*G06F 17/16* (2006.01)
*G06F 17/10* (2006.01)

(52) U.S. Cl.
CPC .............. *G09B 7/04* (2013.01); *G06F 17/10* (2013.01)

(58) Field of Classification Search
CPC ............ G06F 17/10; G06F 17/16; G09B 7/04
(Continued)

(56) References Cited

U.S. PATENT DOCUMENTS

2006/0286539 A1* 12/2006 Tidwell-Scheuring ..................... G09B 5/00 434/353
2007/0174268 A1* 7/2007 Posse .................. G06F 17/3071
(Continued)

OTHER PUBLICATIONS

R. E. Bennett, Automated Scoring of Constructed-Response Literacy and Mathematics Items, Jan. 2011, Arabella Philanthropic Investment Advisors.*
(Continued)

*Primary Examiner* — Eddy Saint-Vil
(74) *Attorney, Agent, or Firm* — Meyertons Hood Kivlin Kowert and Goetzel PC; Jeffrey C. Hood; Luke S. Langsjoen

(57) ABSTRACT

Mechanisms for automatically grading a large number of solutions provided by learners in response to an open response mathematical question. Each solution is mapped to a corresponding feature vector based on the mathematical expressions occurring in the solution. The feature vectors are clustered using a conventional clustering method, or alternatively, using a presently-disclosed Bayesian nonparametric clustering method. A representative solution is selected from each solution cluster. An instructor supplies a grade for each of the representative solutions. Grades for the remaining solutions are automatically generated based on their cluster membership and the instructor supplied grades. The Bayesian method may also automatically identify the location of an error in a given solution. The error location may be supplied to the learner as feedback. The error location may also be used to extract information from correct solutions. The extracted information may be supplied to a learner as a solution hint.

18 Claims, 13 Drawing Sheets

(58) Field of Classification Search
USPC .......................................................... 434/336
See application file for complete search history.

(56) References Cited

U.S. PATENT DOCUMENTS

| | | | | |
|---|---|---|---|---|
| 2008/0313135 | A1* | 12/2008 | Alexe | G06F 17/30598 |
| 2009/0226872 | A1* | 9/2009 | Gunther | G09B 7/00 |
| | | | | 434/350 |
| 2009/0311659 | A1* | 12/2009 | Lottridge | G09B 19/08 |
| | | | | 434/353 |
| 2010/0099070 | A1* | 4/2010 | Abrahamson | G09B 7/00 |
| | | | | 434/350 |
| 2011/0269110 | A1* | 11/2011 | McClellan | G09B 7/00 |
| | | | | 434/353 |
| 2014/0255886 | A1* | 9/2014 | Wang | G09B 5/00 |
| | | | | 434/169 |
| 2014/0272910 | A1* | 9/2014 | del Ninno | G09B 7/06 |
| | | | | 434/362 |
| 2014/0272914 | A1 | 9/2014 | Baraniuk | |
| 2014/0279727 | A1 | 9/2014 | Baraniuk | |
| 2014/0377733 | A1* | 12/2014 | Olsen, Jr. | G09B 7/07 |
| | | | | 434/350 |
| 2015/0004588 | A1 | 1/2015 | Vats | |
| 2015/0044659 | A1* | 2/2015 | Basu | G09B 7/04 |
| | | | | 434/350 |
| 2015/0050636 | A1* | 2/2015 | Lottridge | G09B 19/08 |
| | | | | 434/353 |
| 2015/0064681 | A1* | 3/2015 | Stahovich | G09B 5/00 |
| | | | | 434/350 |
| 2015/0170536 | A1 | 6/2015 | Lan | |

OTHER PUBLICATIONS

Blei, David M. et al. "The Nested Chinese Restaurant Process and Bayesian Nonparametric Inference of Topic Hierarchies" Journal of the AMC, vol. 57, No. 2, Article 7; Jan. 2010; AMC, Inc., New York, NY USA (30 pages).

Frey, Brendan J. et al. "Clustering by Passing Messages Between Data Points" Science Magazine, vol. 315, Feb. 16, 2007 (23 pages).

Gelman, Andrew et al.—IN: Bayesian Data Analysis—Third Edition; 2014; CRC Press, Boca Raton, FL USA (656 pages).

Blei, David M. et al. "Hierarchical Topic Models and the Nested Chinese Restaurant Process" Advances in Neural Information Processing Systems 16 (NIPS); Dec. 2004 (8 pages).

Minka, Thomas P. "Estimating a Dirichlet Distribution" MIT, Nov. 2000; pp. 1-14 (14 pages).

Ng, A. et al. "On Spectral Clustering: Analysis and an Algorthm" Advances in Neural Information Processing Systems 2 (NIPS); Dec. 2002 (8 pages).

Steyvers, et al.—"Probabilistic Topic Models" In: Handbook of Latent Semantic Analysis; Nov. 2007, pp. 427-441 Lawrence Erlbaum Associates, Inc., Mahwah, New Jersey, USA (15 pages).

Wikipedia Website—"SymPy" retrieval date: Apr. 28, 2016—<https://en.wikipedia.org/wiki/SymPy> (11 pages).

Wikipedia Website—"Dirichlet process" retrieval date: Apr. 28, 2016—<https://en.wikipedia.org/wiki/Dirichlet_process (10 pages).

Waters, Andrew et al.—"A Bayesian Nonparametric Approach for the Analysis of Multiple Categorical Item Responses" Journal of Statistical Planning and Inference, vol. 166, Nov. 2015, pp. 52-66 (15 pages).

West, Mike—"Hyperparameter Estimation in Dirichlet Process Mixture Models" ISDS Discussion Paper # 92-A03: Duke University, Durham, North Carolina, USA (6 pages).

Yin, Jianjua et al.—"A Dirichlet Multinominal Mixture Model-based Approach for Short Text Clustering"—Proceedings of the 10th ACM SIGKDD International Conference on Knowledge Discovery and Data Mining; pp. 233-242, Aug. 2014, New York, NY, USA (10 pages).

* cited by examiner $((x^3 + \sin x)/e^x)'$
$= ((x^3+\sin x)e^{-x})'$
$= (x^3+\sin x)'e^{-x} + (x^3+\sin x)(e^{-x})'$
$= (3x^2+\cos x)e^{-x} + (x^3+\sin x)(-e^{-x})'$
$= (3x^2 + \cos x - x^3 - \sin x) e^{-x}$
$= \dfrac{3x^2+\cos x - x^3 - \sin x}{e^x}$

FIG. 2A $((x^3 + \sin x)/e^x)'$
$= \dfrac{(3x^2+\cos x)e^x - (x^3+\sin x)e^x}{e^{2x}}$
$= \dfrac{2x^2 - x^3 + \cos x - \sin x}{e^x}$

FIG. 2B $((x^3+\sin x)/e^x)'$
$= ((x^3+\sin x)e^{-x})'$
$= -e^x(x^3+\sin x) + e^{-x}(3x^2+\cos x)$
$= -e^x x^3 - e^x \sin x + 3e^{-x}x^2 + e^{-x}\cos x$

FIG. 2C $((x^3+\sin x)/e^x)'$
$= x$

FIG. 2D $(x^2 + x + \sin^2 x + \cos^2 x)(2x - 3)$
$= (x^2 + x + 1)(2x - 3)$
$= 2x^3 - 3x^2 + 2x^2 - 3x + 2x - 3$
$= 2x^3 - x^2 - x - 3$

*FIG. 3A*

$(x^2 + x + \sin^2 x + \cos^2 x)(2x-3)$
$= 2x^3 + 2x^2 + 2x \sin^2 x + 2x \cos^2 x$
$\quad - 3x^2 - 3x - 3\sin^2 x - 3\cos^2 x$
$= 2x^3 - x^2 - 3x + 2x(\sin^2 x + \cos^2 x)$
$\quad - 3(\sin^2 x + \cos^2 x)$
$= 2x^3 - x^2 - 3x + 2x(1) - 3(1)$
$= 2x^3 - x^2 - x - 3$

*FIG. 3B*

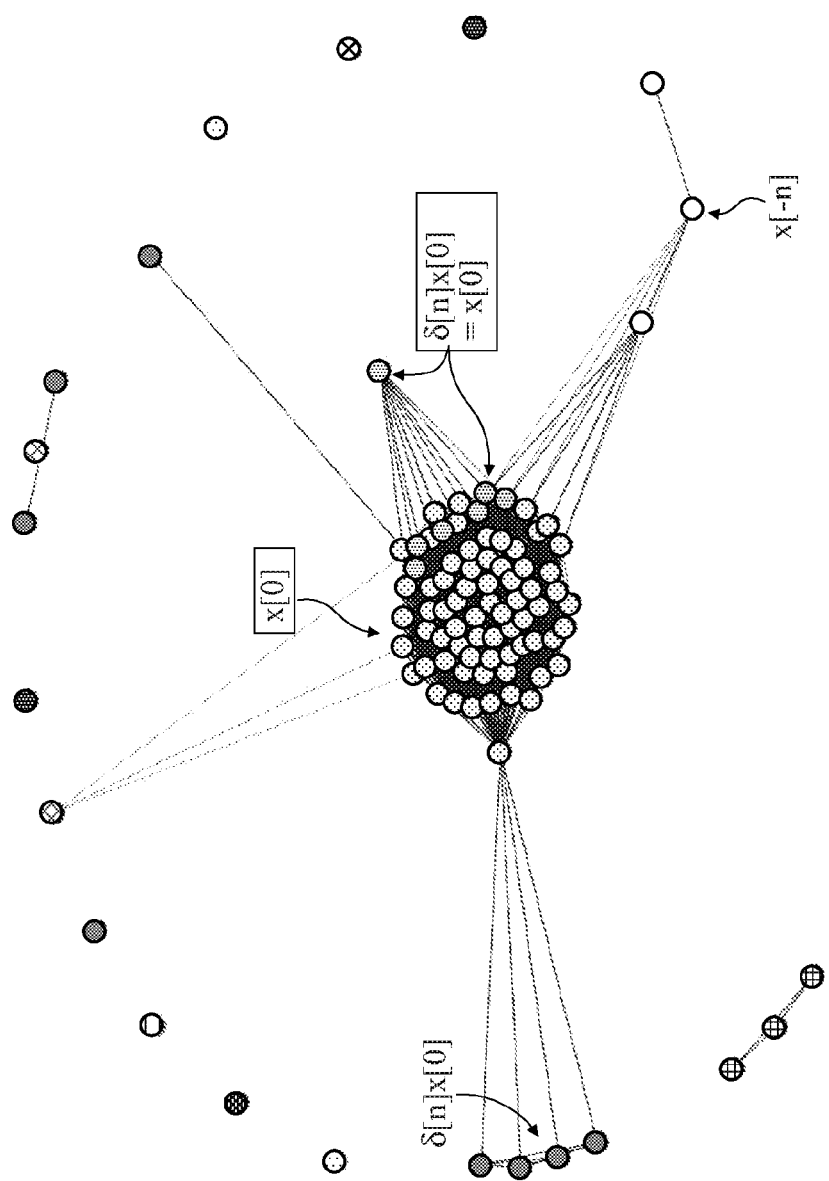

$((x^3 + \sin x)/e^x)'$
$= ( e^x(x^3 + \sin x)' - (x^3 + \sin x)(e^x)' ) / e^{2x}$
prob.incorrect = 0.11, exp.grade = 3
$= ( e^x(2x^2 + \cos x) - (x^3 + \sin x)e^x ) / e^{2x}$
prob.incorrect = 0.66, exp.grade = 2
$= ( 2x^2 + \cos x - x^3 - \sin x ) / e^x$
prob.incorrect = 0.93, exp.grade = 2
$= ( x^2(2-x) + \cos x - \sin x ) / e^x$
prob.incorrect = 0.99, exp.grade = 2

FIG. 7A $(x^2 + x + \sin^2 x + \cos^2 x)(2x-3)$
$= (x^2 + x + 1)(2x - 3)$
prob.incorrect = 0.09, exp.grade = 3
$= 4x^3 + 2x^2 + 2x - 3x^2 - 3x - 3$
prob.incorrect = 0.82, exp.grade = 2
$= 4x^3 - x^2 - x - 3$
prob.incorrect = 0.99, exp.grade = 2

FIG. 7B

MATHEMATICAL LANGUAGE PROCESSING: AUTOMATIC GRADING AND FEEDBACK FOR OPEN RESPONSE MATHEMATICAL QUESTIONS

PRIORITY CLAIM DATA

This application claims the benefit of priority to U.S. Provisional Application No. 62/091,342, filed Dec. 12, 2014, titled "Mathematical Language Processing: Automatic Grading and Feedback for Open Response Mathematical Questions", invented by Shiting Lan, Divyanshu Vats, Andrew E. Waters, and Richard G. Baraniuk, which is hereby incorporated by reference in its entirety as though fully and completely set forth herein.

GOVERNMENT RIGHTS IN INVENTION

This invention was made with government support under Grant Number IIS-1124535 awarded by the National Science Foundation (NSF). The government has certain rights in the invention.

FIELD OF THE INVENTION

The present invention relates to the field of machine learning, and more particularly, to mechanisms for automatically grading solutions to open response mathematical questions.

DESCRIPTION OF THE RELATED ART

In modem online education, learners may take courses via the Internet (or more generally, via a computer network). For example, an educational service provider may provide courses of instruction that the learners may access using their client computers. A course may include tests or assessments of the learner's knowledge and/or skill in relation to the course material. An assessment includes a number of questions that the learners are expected to answer. An instructor (or instructors) then grades the answers to each question. However, in the environment of online education, the number of learners in a given course may be large, so large that it becomes difficult for the instructor to provide grades (or, at least accurate grades) for all the learner-submitted answers.

In a STEM-related course, the questions in an assessment are often open response mathematical questions, where the learner is expected to provide a sequence of mathematical expressions, demonstrating his/her solution to the question. (STEM is an acronym for "Science, Technology, Engineering, and Mathematics.) Such questions are important for the testing of knowledge and skill in STEM courses. However, they may be difficult to grade because they require the instructor to trace the learner's flow of logic from one mathematical expression to the next, and determine where any errors are made in said flow (or, at least, where the first error is made in said flow). Thus, the grading capacity of instructors may present a limit to the number of learners that can be served in an online course.

Even in the traditional educational environment where learners receive face-to-face instruction from an instructor, there may be a large number of learners in a course and/or a large number of solutions to grade. Thus, the same issues with difficulty of solution grading may exist.

Thus, there exists a need for mechanisms capable of enhancing the capacity of instructors (or other agents of education) to provide grades for solutions to open response mathematical questions.

SUMMARY

While computer and communication technologies have provided effective means to scale up many aspects of education, the submission and grading of assessments such as homework assignments and tests remains a weak link. In this patent, we address (among other things) the problem of automatically grading the kinds of open response mathematical questions that figure prominently in STEM courses. Our data-driven framework for mathematical language processing (MLP) may leverage solution data from a large number of learners to evaluate the correctness of their solutions, assign partial-credit scores, and provide feedback to each learner on the likely locations of any errors. In some embodiments, MLP may include three main steps. First, we may convert each solution to an open response mathematical question into a series of numerical features. Second, we may cluster the features from several solutions to uncover the structures of correct, partially correct, and incorrect solutions. We develop two different clustering approaches, one that leverages generic clustering algorithms and one based on Bayesian nonparametrics. Third, we may automatically grade the remaining (potentially large number of) solutions based on their assigned cluster and one instructor-provided grade per cluster. As a bonus, we may track the cluster assignment of each step of a multistep solution and determine when it departs from a cluster of correct solutions, which enables us to indicate the likely locations of errors to learners. We test and validate MLP on real-world MOOC data, to demonstrate how it can substantially reduce the human effort required in large-scale educational platforms.

In one set of embodiments, a method for operating a computer, in order to automatically grade solutions submitted by learners in response to a question, may include one or more of the following operations.

The method may include receiving the solutions via a computer network, wherein each of the solutions is provided by a respective one of the learners, and includes one or more mathematical expressions, wherein a majority of the solutions include more than one mathematical expression.

For each of the solutions, the method may include determining a corresponding feature vector based on the mathematical expressions occurring in the solution.

The method may include determining measures of similarity between the solutions, wherein said determining includes, for each pair of the solutions, determining a measure of similarity between the solutions of the pair based on the corresponding pair of feature vectors.

The method may include clustering the solutions into K>1 clusters based on the similarity measures.

The method may include assigning grades to the solutions, wherein said assigning includes: (a) receiving grading input from one or more graders via the computer network, wherein, for each of the K clusters, the grading input indicates a grade to be assigned to a representative solution from the cluster; and (b) for each of the K clusters, assigning the grade of the representative solution in that cluster to the other solutions in the cluster.

The method may include storing the grades for the solutions in a memory.

In one set of embodiments, a method for operating a computer, in order to automatically grade solutions submitted by learners in response to a question, may include one or more of the following operations.

The method may include receiving the solutions via a computer network, wherein each of the solutions is provided by a respective one of the learners, and includes one or more mathematical expressions, wherein a majority of the solutions include more than one mathematical expression.

For each of the solutions, the method may include determining a corresponding feature vector based on the mathematical expressions occurring in the solution.

The method may include performing a probabilistic clustering algorithm based on the feature vectors of the solutions to determine: (a) $\hat{K}$ conditional probability distributions corresponding to $\hat{K}$ respective clusters, wherein each of the $\hat{K}$ conditional probability distributions characterizes a corresponding distribution of generic feature vector y given membership in the corresponding cluster; and (b) for each of the solutions, an assignment of the solution to a corresponding one of the $\hat{K}$ clusters.

The method may include assigning grades to the solutions, wherein said assigning includes: receiving grading input from one or more graders via the computer network, wherein, for each of the $\hat{K}$ clusters, the grading input indicates a grade to be assigned to a representative solution from the cluster; and for each of the solutions other than the representative solutions, assigning a grade to the solution based on the grades assigned to the representative solutions and the $\hat{K}$ conditional probability distributions evaluated on the feature vector of the solution.

The method may include storing the grades for the solutions in a memory.

Additional embodiments are described in U.S. Provisional Application No. U.S. Provisional Application No. 62/091,342, filed Dec. 12, 2014.

BRIEF DESCRIPTION OF THE DRAWINGS

A better understanding of the present invention can be obtained when the following detailed description of the preferred embodiments is considered in conjunction with the following drawings.

FIGS. 2A-2D show example solutions to the question "Find the derivative of $(x^3+\sin x)/e^x$ that were assigned scores of 3, 2, 1 and 0 out of 3, respectively, by our MLP-B algorithm. FIG. 2A is a correct solution that receives 3/3 credits. FIG. 2B is an incorrect solution that receives 2/3 credits due to an error in the last expression. FIG. 1C is an incorrect solution that receives 1/3 credits due to an error in the second expression. FIG. 1D is an incorrect solutions that receives 0/3 credits.

FIGS. 3A-3B show examples of two different yet correct paths to solve the question, "Simplify the expression $$(x^2+x+\sin^2 x+\cos^2 x)(2x-3).\text{"}$$

FIG. 3A shows a correct solution that makes the simplification $$\sin^2 x+\cos^2 x=1$$

in the first expression. FIG. 3B shows a correct solution that makes said simplification in the third expression.

FIGS. 4A-4D illustrate the clusters obtained from one embodiment of MLP-S by applying affinity propagation (AP) on the similarity matrix S corresponding to learners' solutions to four different mathematical questions. Each node corresponds to a solution. Nodes with the same pattern code (sparsely dotted, intermediate-density dotted, densely dotted, horizontally hatched, solid, cross hatched, diagonally cross hatched) correspond to solutions that are estimated to be in the same cluster. The thickness of the edge between two solutions is proportional to their similarity score. Boxed solutions are correct; all others are in varying degrees of correctness.

FIGS. 7A-7B demonstrate real-time feedback generation by one embodiment of MLP-B while learners enter their solutions. After each expression, we compute both the probability that the learner's solution belongs to a cluster that does not have full credit and the learner's expected grade. An alert is generated when the expected credit is less than full credit. FIG. 7A shows a sample feedback generation process where the learner makes an error in the expression in Line 2 while attempting to solve Question 1. FIG. 7B shows a sample feedback generation process where the learner makes an error in the expression in Line 3 while attempting to solve Question 2.

Figure 1:
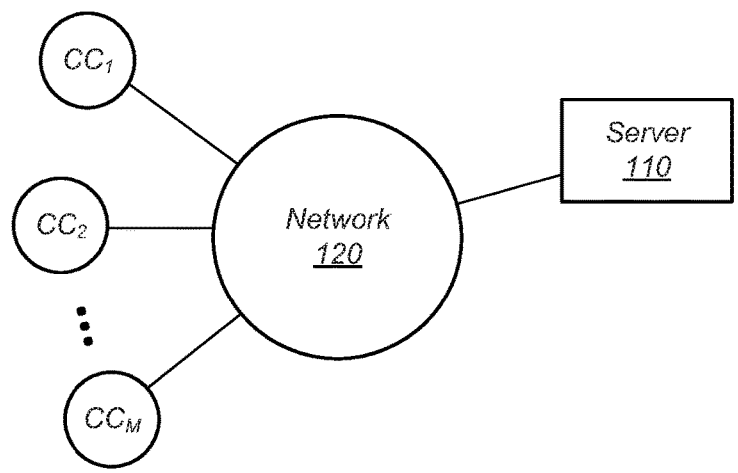
FIG. 1 illustrates one embodiment of a server 110 that may be used to perform any of the various method embodiments disclosed herein.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Terminology

A memory medium is a non-transitory medium configured for the storage and retrieval of information. Examples of memory media include: various kinds of semiconductor-based memory such as RAM and ROM; various kinds of magnetic media such as magnetic disk, tape, strip and film; various kinds of optical media such as CD-ROM and DVD-ROM; various media based on the storage of electrical charge and/or any of a wide variety of other physical quantities; media fabricated using various lithographic techniques; etc. The term "memory medium" includes within its scope of meaning the possibility that a given memory medium might be a union of two or more memory media that reside at different locations, e.g., in different portions of an integrated circuit or on different integrated circuits in an electronic system or on different computers in a computer network.

A computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

A computer system is any device (or combination of devices) having at least one processor that is configured to execute program instructions stored on a memory medium. Examples of computer systems include personal computers (PCs), laptop computers, tablet computers, mainframe computers, workstations, server computers, client computers, network or Internet appliances, hand-held devices, mobile devices such as media players or mobile phones, personal digital assistants (PDAs), computer-based television systems, grid computing systems, wearable computers, computers in personalized learning systems, computers implanted in living organisms, computers embedded in head-mounted displays, computers embedded in sensors forming a distributed network, computers embedded in a camera devices or imaging devices or measurement devices, etc.

A programmable hardware element (PHE) is a hardware device that includes multiple programmable function blocks connected via a system of programmable interconnects. Examples of PHEs include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores).

In some embodiments, a computer system may be configured to include a processor (or a set of processors) and a memory medium, where the memory medium stores program instructions, where the processor is configured to read and execute the program instructions stored in the memory medium, where the program instructions are executable by the processor to implement a method, e.g., any of the various method embodiments described herein, or, any combination of the method embodiments described herein, or, any subset of any of the method embodiments described herein, or, any combination of such subsets.

In one set of embodiments, a learning system may include a server 110 (or a set of interconnected servers) as shown in FIG. 1. In some embodiments, the server may be controlled by a learning service provider.

The server 110 may be configured to perform any of the various methods described herein. Client computers $CC_1$, $CC_2$, . . . , $CC_M$ may access the server via a network 120 (e.g., the Internet or any other computer network). The persons operating the client computers may include learners, instructors, graders, the authors of questions for assessments, the authors of learning resources, etc.

The learners may use client computers to access and interact with learning resources provided by the server 110, e.g., learning resources such as text material, videos, lab exercises, simulations, live communication with a tutor or instructor or other learners, etc.

The learners may use client computers to access questions from the server and provide answers to the questions, e.g., as part of a test or quiz or assessment. In the context of a STEM course, the learners may access open response mathematical questions, and provide solutions including mathematical expressions.

Furthermore, an instructor (or grader) may access the server to provide grades for particular solutions selected by the server. As described variously herein, the server may cluster the learner-provided solutions, and select a representative solution from each of the clusters. The instructor may provide a grade for each of the representative solutions. The server may then automatically grade the remaining solutions, effectively multiplying the instructor's grading effort.

In some embodiments, instructors or other authorized persons may access the server to perform one or more tasks such as:

selecting questions from a database of questions, e.g., selecting questions for a new test to be administered for a given set of concepts;

assigning tags to questions (e.g., assigning one or more character strings that identify the one or more concepts associated with each questions);

drafting a new question;

editing a currently-existing question;

drafting or editing a model solutions to a question;

drafting or editing feedback text to be transmitted to a learner or a set of learners;

viewing a cluster diagram illustrating similarities between solutions, e.g., as variously described herein;

sending and receiving messages to/from learners;

uploading video and/or audio lectures (or more generally, educational content) for storage and access by the learners.

In another set of embodiments, a person (e.g., an instructor) may execute one or more of the presently-disclosed computational methods on a stand-alone computer, e.g., on his/her personal computer or laptop. Thus, the computational method(s) need not be executed in a client-server environment.

Mathematical Language Processing: Automatic Grading and Feedback for Open Response Mathematical Questions Large-scale educational platforms have the capability to revolutionize education by providing inexpensive, high-quality learning opportunities for millions of learners worldwide. Examples of such platforms include massive open online courses (MOOCs) [6, 7, 9, 10, 16, 42], intelligent tutoring systems [43], computer-based homework and testing systems [1, 31, 38, 40], and personalized learning systems [24]. While computer and communication technologies have provided effective means to scale up the number of learners viewing lectures (via streaming video), reading the textbook (via the web), interacting with simulations (via a graphical user interface), and engaging in discussions (via online forums), the submission and grading of assessments such as homework assignments and tests remains a weak link.

There is a pressing need to find new ways and means to automate two critical tasks that are typically handled by the instructor or course assistants in a small-scale course: (i) grading of assessments, including allotting partial credit for partially correct solutions, and (ii) providing individualized feedback to learners on the locations and types of their errors.

Substantial progress has been made on automated grading and feedback systems in several restricted domains, including essay evaluation using natural language processing (NLP) [1,33], computer program evaluation [12, 15, 29, 32, 34], and mathematical proof verification [8, 19, 21].

In this patent, we disclose (among other things) solutions to the problem of automatically grading the kinds of open response mathematical questions that figure prominently in STEM (science, technology, engineering, and mathematics) education. To the best of our knowledge, there exist no tools to automatically evaluate and allot partial credit scores to the solutions of such questions. As a result, large-scale education platforms have resorted either to oversimplified multiple choice input and binary grading schemes (correct/incorrect), which are known to convey less information about the learners' knowledge than open response questions [17], or peer-grading schemes [25, 26], which shift the burden of grading from the course instructor to the learners. (While peer grading appears to have some pedagogical value for learners [30], each learner typically needs to grade several solutions from other learners for each question they solve, in order to obtain an accurate grade estimate.)

In this patent, we develop a data-driven framework for mathematical language processing (MLP) that leverages solution data from a large number of learners to evaluate the correctness of solutions to open response mathematical questions, assign partial-credit scores, and provide feedback to each learner on the likely locations of any errors. The scope of our framework is broad and covers questions whose solution involves one or more mathematical expressions. This includes not just formal proofs but also the kinds of mathematical calculations that figure prominently in science and engineering courses. Examples of solutions to two algebra questions of various levels of correctness are given in FIGS. 2A-2D and 3A-3B. In this regard, our work differs significantly from that of [8], which focuses exclusively on evaluating logical proofs.

In one set of embodiments, our MLP framework comprises three main steps.

First, each solution to an open response mathematical question may be converted into a series of numerical features. In deriving these features, symbolic mathematics may be used to transform mathematical expressions into a canonical form.

Second, the features from several solutions may be clustered, to uncover the structures of correct, partially correct, and incorrect solutions. We develop two different clustering approaches: MLP-S and MLP-B. MLP-S uses the numerical features to define a similarity score for any given pair of solutions and then applies a generic clustering algorithm, such as spectral clustering (SC) [22] or affinity propagation (AP) [11]. We show that MLP-S is also useful for visualizing mathematical solutions. This can help instructors identify groups of learners that make similar errors so that instructors can deliver personalized remediation. MLP-B defines a nonparametric Bayesian model for the solutions and applies a Gibbs sampling algorithm to cluster the solutions.

Third, once a human assigns a grade to at least one solution in each cluster, the remaining (potentially large number of) solutions may be automatically graded based on their assigned cluster. As a bonus, in MLP-B, we can track the cluster assignment of each step in a multistep solution and determine when it departs from a cluster of correct solutions, which enables us to indicate the likely locations of errors to learners.

In developing MLP, we tackle three main challenges of analyzing open response mathematical solutions. First, solutions might contain different notations that refer to the same mathematical quantity. For instance, in FIGS. 2A-2D, the learners use both $e^{-x}$ and $1/e^x$ to refer to the same quantity. (FIGS. 2A-2D illustrate four respective solutions to a question regarding differentiation, provided by four respective learners.) Second, some questions admit more than one path to the correct/incorrect solution. For instance, in FIGS. 3A-3B we see two different yet correct solutions to the same question. It is typically infeasible for an instructor to enumerate all of these possibilities to automate the grading and feedback process. Third, numerically verifying the correctness of the solutions does not always apply to mathematical questions, especially when simplifications are required. For example, a question that asks to simplify the expression $$\sin^2 x + \cos^2 x + x$$

can have both $$1+x \text{ and } \sin^2 x + \cos^2 x + x$$

as numerically correct answers, since both these expressions output the same value for all values of x. However, the correct answer is 1+x, since the question expects the learners to recognize that $\sin^2 x + \cos^2 x = 1$. Thus, methods developed to check the correctness of computer programs and formulae by specifying a range of different inputs and checking for the correct outputs, e.g., [32], cannot always be applied to accurately grade open response mathematical questions.

Related Work

Prior work has led to a number of methods for grading and providing feedback to the solutions of certain kinds of open response questions. A linear regression-based approach has been developed to grade essays using features extracted from a training corpus using Natural Language Processing (NLP) [1, 33]. Unfortunately, such a simple regression-based model does not perform well when applied to the features extracted from mathematical solutions. Several methods have been developed for automated analysis of computer programs [15,32]. However, these methods do not apply to the solutions to open response mathematical questions, since they lack the structure and compilability of computer programs. Several methods have also been developed to check the correctness of the logic in mathematical proofs [8, 19, 21]. However, these methods apply only to mathematical proofs involving logical operations and not the kinds of open-ended mathematical calculations that are often involved in science and engineering courses.

The idea of clustering solutions to open response questions into groups of similar solutions has been used in a number of previous endeavors: [2, 5] uses clustering to grade short, textual answers to simple questions; [23] uses clustering to visualize a large collection of computer programs; and [28] uses clustering to grade and provide feedback on computer programs. Although the concept of clustering is used in the MLP framework, the feature building techniques used in MLP are very different from the previous endeavors, since the structure of mathematical solutions differs significantly from short textual answers and computer programs.

This patent includes the following sections (among others). In the next section, we develop our approach to convert open response mathematical solutions to numerical features that can be processed by machine learning algorithms. We then develop MLP-S and MLP-B and use real-world MOOC data to showcase their ability to accurately grade a large number of solutions based on the instructor's grades for a relatively small number of solutions, thus substantially reducing the human effort required in large-scale educational platforms. We close with a discussion and perspectives on future research directions.

MLP Feature Extraction

In some embodiments, the first step in the MLP framework is to transform a collection of solutions to an open response mathematical question into a set of numerical features. In later sections, we show how the numerical features can be used to cluster and grade solutions as well as generate informative learner feedback.

A solution to an open response mathematical question will typically contain a mixture of explanatory text and mathematical expressions. Since the correctness of a solution depends primarily on the mathematical expressions, in some embodiments we may ignore the text when deriving features.

A workhorse of NLP is the bag-of-words model; it has found tremendous success in text semantic analysis. This model treats a text document as a collection of words and uses the frequencies of the words as numerical features to perform tasks like topic classification and document clustering [4, 5].

A solution to an open response mathematical question may include a series of mathematical expressions that are chained together by text, punctuation, or mathematical delimiters including $=, \leq, >, \propto, \approx$, etc. For example, the solution in FIG. 2B contains the expressions $((x^3+\sin x)/e^x)'$, $((3x^2+\cos x)e^x-(x^3+\sin x)e^x)/e^{2x}$, and $(2x^2-x^3+\cos x-\sin x)/e^x$, that are all separated by the delimiter "=".

MLP may identify the unique mathematical expressions contained in the union of the learners' solutions and use them as features, effectively extending the bag-of-words model to use mathematical expressions as features rather than words. To coin a phrase, MLP uses a novel bag-of-expressions model.

Once the mathematical expressions have been extracted from a solution, they may be parsed using a symbolic mathematics library such as SymPy. SymPy is the open source Python library for symbolic mathematics [36]. (In one embodiment, we use the parse_expr function of SymPy.) SymPy has powerful capability for simplifying expressions. For example, $x^2+x^2$ can be simplified to $2x^2$, and $e^x x^2/e^{2x}$ can be simplified to $e^{-x}x^2$. In this way, we can identify the equivalent terms in expressions that refer to the same mathematical quantity, resulting in more accurate features. In practice, for some questions, however, it might be necessary to tone down the level of SymPy's simplification. For instance, the key to solving the question in FIGS. 3A-3B is to simplify the expression using the Pythagorean identity $\sin^2 x+\cos^2 x=1$. If SymPy is called on to perform such a simplification automatically, then it will not be possible to verify whether a learner has correctly navigated the simplification in their solution. For such problems, it is advisable to perform only arithmetic simplifications.

After extracting the expressions from the solutions, the expressions may be transformed into numerical features. We assume that N learners submit solutions to a particular mathematical question. (N may be so large that an instructor may find it practically impossible to grade the N learner-provided solutions.) Extracting the expressions from each solution, e.g., using SymPy, yields a total of V unique expressions across the N solutions.

We encode the solutions in an integer-valued solution feature matrix $Y \in \mathbb{N}^{V \times N}$ whose rows correspond to different expressions and whose columns correspond to different solutions; that is, the (i, j)th entry of Y is given by $Y_{i,j}$=number of times expression $i$ appears in solution $j$.

Each column of Y is a numerical representation of a corresponding mathematical solution. Note that we do not consider the ordering of the expressions in this embodiment of the model. (However, in alternative embodiments of the model, the ordering of expressions may be considered.) Furthermore, in some embodiments, we indicate in Y only the presence and not the frequency of an expression, i.e., $Y \in \{0,1\}^{V \times N}$ and $$Y_{i,j} = \begin{cases} 1 & \text{if expression } i \text{ appears in solution } j, \\ 0 & \text{otherwise.} \end{cases} \quad (1)$$

(We postulate that in most open-ended mathematical derivations, multiple appearances of the same expression does not contain more information about the correctness of the solution than a single appearance.) The extension to encoding frequencies is straightforward.

To illustrate how the matrix Y may be constructed, consider the solutions in FIGS. 3A and 3B. Across both solutions, there are 7 unique expressions. Thus, Y is a 7×2 matrix, with each row corresponding to a unique expression. Letting the first four rows of Y correspond to the four expressions in FIG. 3A and the remaining three rows to expressions 2-4 in FIG. 3B, we have $$Y = \begin{bmatrix} 1 & 1 & 1 & 1 & 0 & 0 & 0 \\ 1 & 0 & 0 & 1 & 1 & 1 & 1 \end{bmatrix}^T.$$

We end this section with the crucial observation that, for a wide range of mathematical questions, many expressions will be shared across learners' solutions. This is true, for instance, in FIGS. 3A-3B. This suggests that there are a limited number of types of solutions to a question (both correct and incorrect), and that solutions of the same type tend to be similar to each other. This leads us to the conclusion that the N solutions to a particular question can be effectively clustered into K<<N clusters. In the next two sections, we will develop MLP-S and MLP-B, two algorithms to cluster solutions according to their numerical features.

MLP-S: Similarity-Based Clustering

In this section, we outline MLP-S, which clusters and then grades solutions using a solution similarity-based approach. The MLP-S Model We start by using the solution features in Y to define a notion of similarity for the arbitrary pair of solutions. We define the N×N similarity matrix S containing the similarities between all pairs of solutions, with its (i, j)th entry being the similarity $S_{i,j}$ between solutions i and j. For example, in one embodiment, $$S_{i,j} = \frac{y_i^T y_j}{\min\{y_i^T y_i, y_j^T y_j\}}. \quad (2)$$

The column vector $y_i$ denotes the ith column of Y and corresponds to the solution of learner i. Informally, $S_{i,j}$ is the number of common expressions between solution i and solution j divided by the minimum of the number of expressions in solutions i and j. A large/small value of $S_{i,j}$ corresponds to the two solutions being similar/dissimilar. For example, the similarity between the solutions in FIG. 2A and FIG. 2B is 1/3, and the similarity between the solutions in FIG. 3A and FIG. 3B is 1/2. S is symmetric, and $0 \leq S_{i,j} \leq 1$. Equation (2) is just one of many possible solution similarity metrics.

Clustering Solutions in MLP-S

Having illustrated how the similarity $S_{i,j}$ between two solutions i and j can be measured, we now cluster the N solutions into K<<N clusters such that the solutions within each cluster have high similarity score between them and solutions in different clusters have low similarity score between them.

Given the similarity matrix S, we can use any of the multitude of standard clustering algorithms to cluster solutions. Two examples of clustering algorithms are spectral clustering (SC) [22] and affinity propagation (AP) [11]. The SC algorithm requires specifying the number of clusters K as an input parameter, while the AP algorithm does not.

Figure 4A:
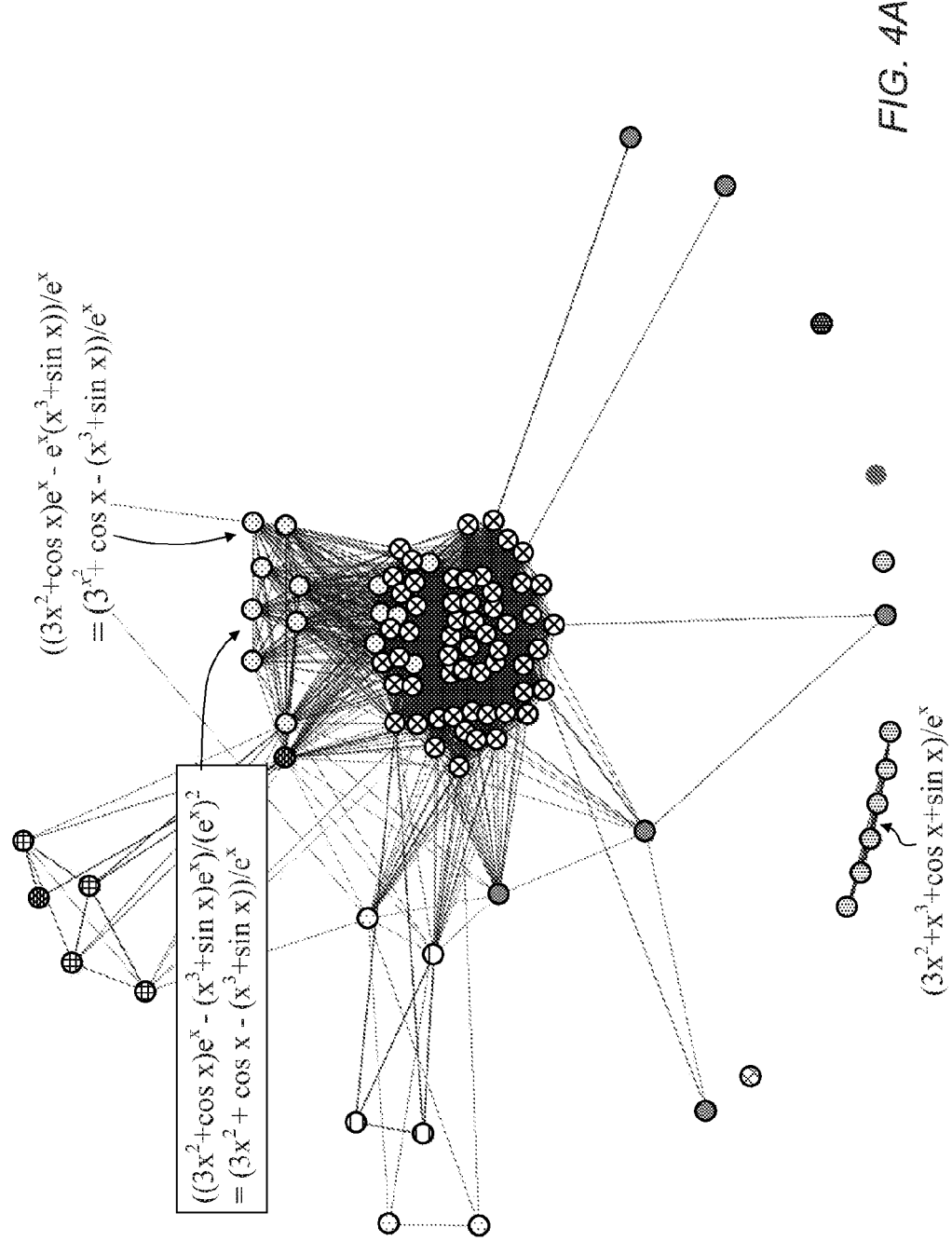
Figure 4B:
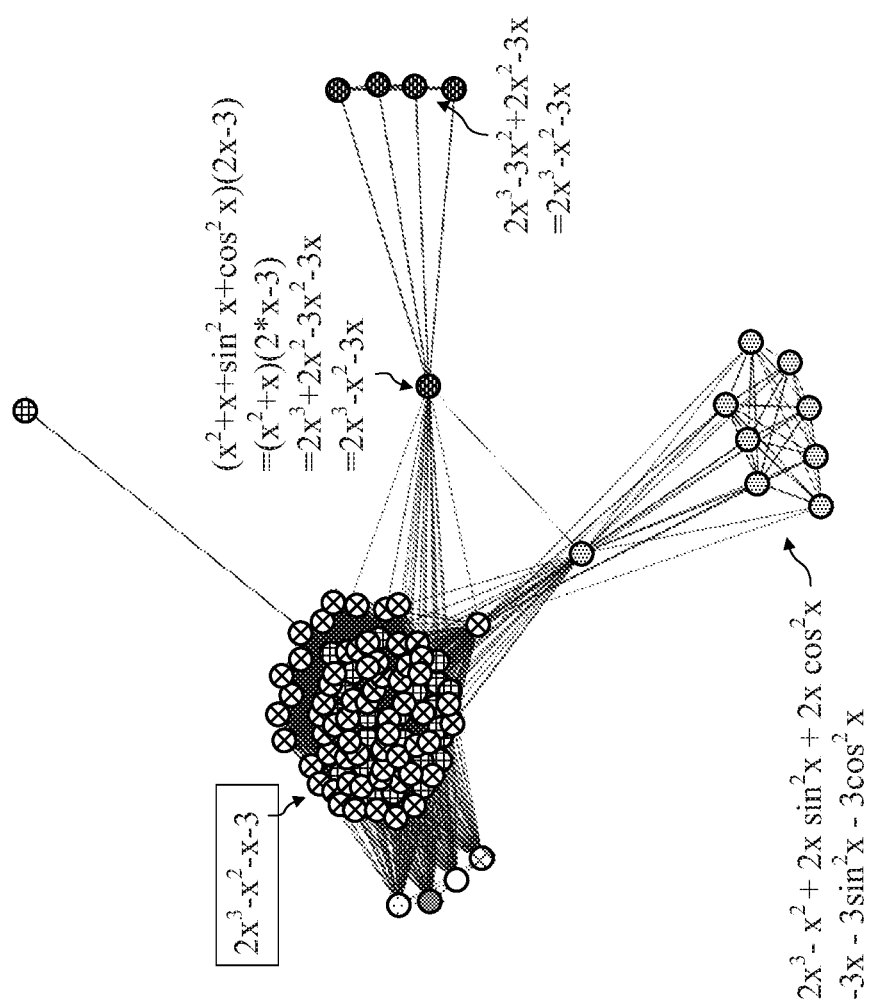
Figure 4C:
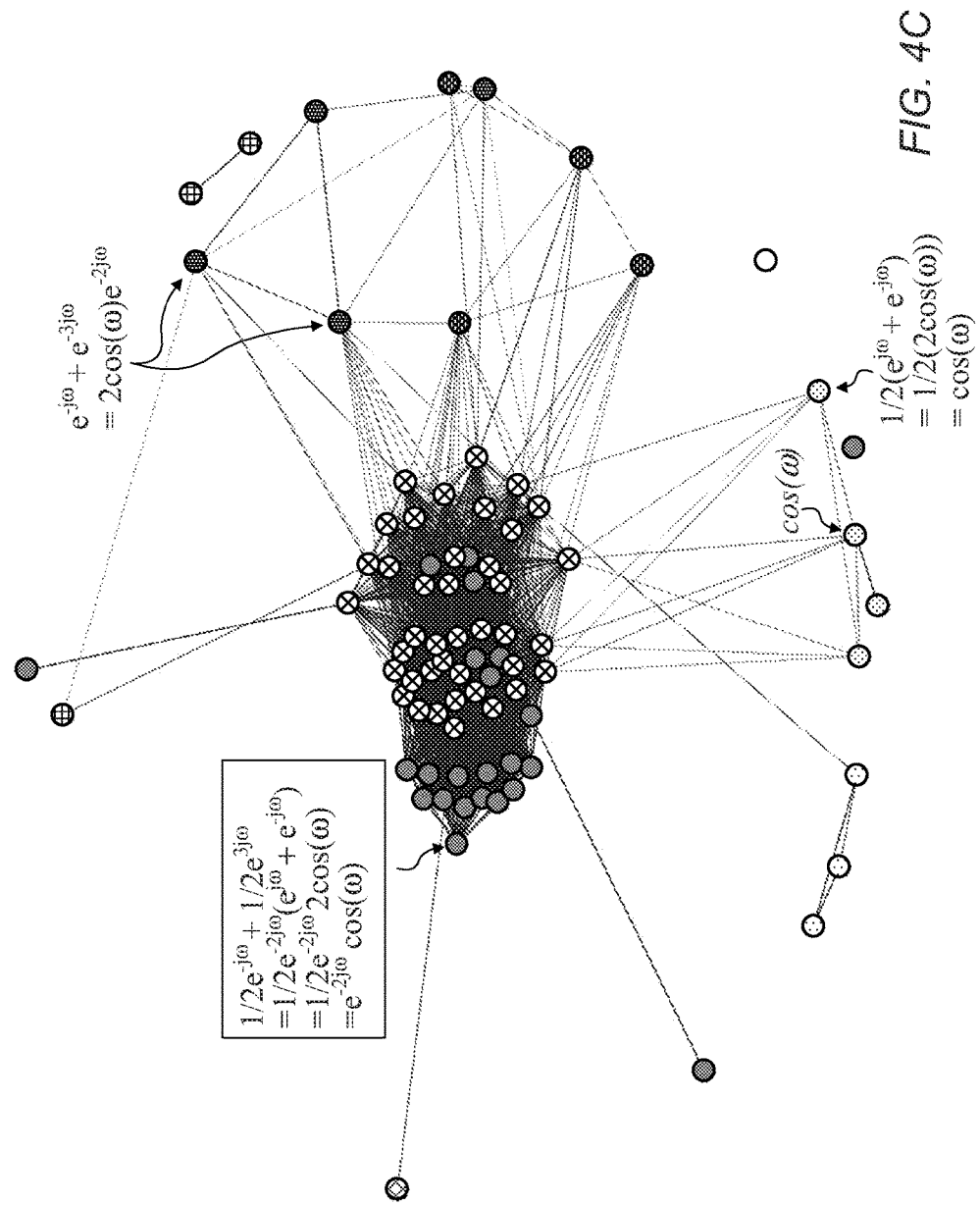

FIGS. 4A-4D illustrate how AP is able to identify clusters of similar solutions from solutions to four different mathematical questions. FIGS. 4A and 4B correspond to solutions to the questions in FIGS. 2 and 3, respectively. FIGS. 4C and 4B correspond to solutions to two signal processing questions. Each node in each figure corresponds to a solution, and nodes with the same pattern code (solid, dotted, x, horizontal hatch) correspond to solutions that belong to the same cluster. For each figure, we show a sample solution from some of these clusters, with the boxed solutions corresponding to correct solutions. We can make three interesting observations from FIG. 4A-4D:

1. In FIG. 4A, we cluster a solution having the final answer $$((3x^2 + \cos x)e^x - (x^3 + \sin x)e^x)/e^{2x}$$

with a solution having the final answer $$((3^{x^2} + \cos x)e^x - (x^3 + \sin x)e^x)/e^{2x}.$$

Although the later solution is incorrect, it contained a typographical error where 3*x∧2 was typed as 3∧x∧2. MLP-S is able to identify this typographical error, since the expression before the final solution is contained in several other correct solutions.

2. In FIG. 4B, the correct solution requires identifying the trigonometric identity $\sin^2 x + \cos^2 x = 1$. The clustering algorithm is able to identify a subset of the learners who were not able to identify this relationship, and hence, could not simplify their final expression.

3. MLP-S is able to identify solutions that are strongly connected to each other. Such a visualization can be extremely useful for course instructors. For example, an instructor can easily identify a group of learners whose lack of mastery of a certain skill results in a common error. The instructor may accordingly adjust the course plan to help these learners.

Auto-Grading via MLP-S

Having clustered all solutions into a relatively small number K of clusters, MLP-S assigns the same grade to all solutions in the same cluster. If a course instructor assigns a grade to one solution from each cluster, then MLP-S can automatically grade the remaining N−K solutions. Thus, MLP-S multiplies the instructor's grading capacity by factor N/K.

We construct the index set $I_S$ of solutions that the course instructor needs to grade as $$I_S = \left\{ \underset{i \in C_k}{\text{argmax}} \sum_{j=1}^{N} S_{i,j}, k = 1, 2, \ldots, K \right\}.$$

where $C_k$ represents the index set of the solutions in cluster k. In words, in each cluster, we select the solution having the highest similarity to the other solutions (ties are broken randomly) to include in $I_S$. We demonstrate the performance of auto-grading via MLP-S in the experimental results section below.

MLP-B: Bayesian Nonparametric Clustering

In this section, we outline MLP-B, which clusters and then grades solutions using a Bayesian nonparameterics-based approach.

The MLP-B Model

Following the observation that the N solutions can be effectively clustered into K<<N clusters, let z be the N×1 cluster assignment vector, with $z_j \in \{1, \ldots, K\}$ denoting the cluster assignment of the jth solution with $j \in \{1, \ldots, N\}$. Using this latent variable, we may model the probability of the solution of the learners' solutions to the question as $$p(Y) = \Pi_{j=1}^{N} (\Sigma_{k=1}^{K} p(y_j | z_j = k) p(z_j = k)),$$

where $y_j$, the jth column of the data matrix Y, corresponds to learner j's solution to the question. Here we have implicitly assumed that the learners' solutions are independent of each other. (However, alternative embodiments are contemplated where there exist dependencies between the solutions, or subsets of the solutions.) By analogy to topic models [4, 35], we may assume that learner j's solution to the question, $y_j$, is generated according to a multinomial distribution given the cluster assignments z as $$p(y_j | z_j = k) = \tag{3}$$

$$\text{Mult}(y_j | \phi_k) = \frac{\left( \sum_i Y_{i,j} \right)!}{Y_{1,j}! Y_{2,j}! \ldots Y_{V,j}!} \Phi_{1,k}^{Y_{1,j}} \Phi_{2,k}^{Y_{2,j}} \ldots \Phi_{V,k}^{Y_{V,j}},$$

where $\Phi \in [0,1]^{V \times K}$ is a parameter matrix with $\Phi_{v,k}$ denoting its (v, k)th entry. $\phi_k \in [0,1]^{V \times 1}$ denotes the kth column of $\Phi$ and characterizes the multinomial distribution over all the V features for cluster k.

In practice, one often has no information regarding the number of clusters K. Therefore, we may consider K as an unknown parameter and infer it from the solution data. In order to do so, we may impose a Chinese restaurant process (CRP) prior on the cluster assignments z, parameterized by a parameter α. The CRP characterizes the random partition of data into clusters, in analogy to the seating process of customers in a Chinese restaurant. It is widely used in Bayesian mixture modeling literature [3, 14]. Under the CRP prior, the cluster (table) assignment of the jth solution (customer), conditioned on the cluster assignments of all the other solutions, follows the distribution $$p(z_j = k \mid z_{\neg j}, \alpha) = \begin{cases} \dfrac{n_{k,\neg j}}{N-1+\alpha}, & \text{if cluster } k \text{ is occupied,} \\ \dfrac{\alpha}{N-1+\alpha}, & \text{if cluster } k \text{ is empty,} \end{cases} \quad (4)$$

where $n_{k,\neg j}$ represents the number of solutions that belong to cluster $k$ excluding the current solution $j$, with $\Sigma_{k=1}^{K} n_{k,\neg j} = N-1$. The vector $z_{\neg j}$ represents the cluster assignments of the other solutions. The flexibility of allowing any solution to start a new cluster of its own enables us to automatically infer $K$ from data. It is known [37] that the expected number of clusters under the CRP prior satisfies $K \sim O(\alpha \log N) \ll N$, so our method scales well as the number of learners $N$ grows large. We may also impose a Gamma prior $\alpha \sim \text{Gam}(\alpha_\alpha, \alpha_\beta)$ on $\alpha$, to help us infer its value.

Since the solution feature data $Y$ is assumed to follow a multinomial distribution parameterized by $\Phi$, we may impose a symmetric Dirichlet prior over $\Phi$ as $\phi_k \sim \text{Dir}(\phi_k \mid \beta)$ because of its conjugacy with the multinomial distribution [13]. The symbol "$\sim$" means "distributed as", in the sense of probability of theory. The parameter $\beta$ is greater than zero.

Figure 5:
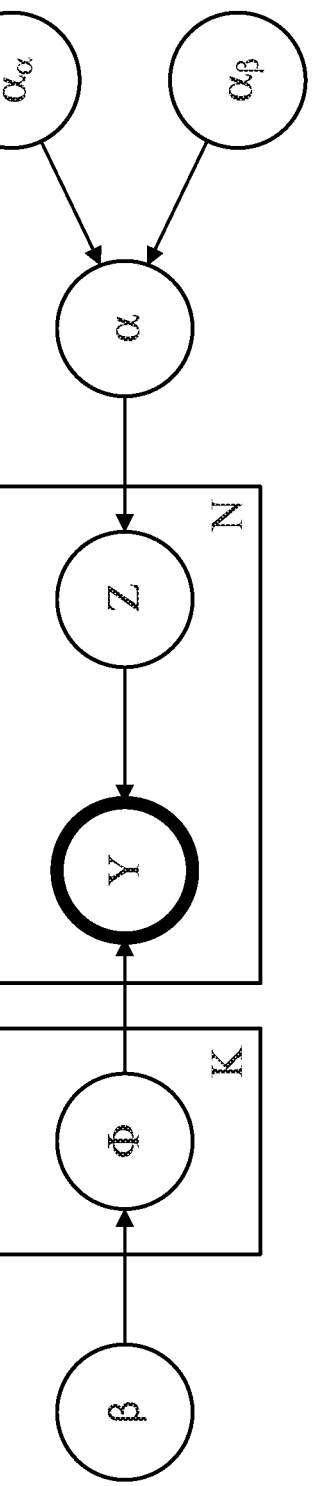
FIG. 5 presents a graphical model of the generation process of solutions to mathematical questions, according to some embodiments. $\alpha_\alpha$, $\alpha_\beta$ and $\beta$ are hyperparameters, z and $\Phi$ are latent variables to be inferred, and Y is the observed data defined in equation (1).
Figure 6B:
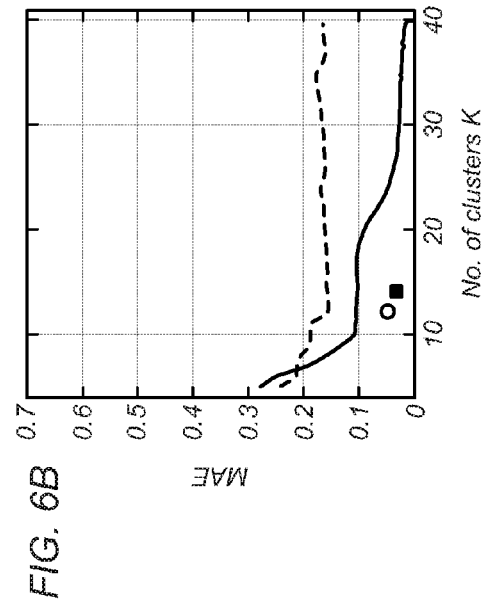
FIGS. 6A-6D illustrate the mean absolute error (MAE) versus the number of instructor graded solutions (clusters) K, for Questions 1-4, respectively, according to some embodiments. For example, on Question 1, MLP-S and MLP-B estimate the true grade of each solution with an average error of around 0.1 out of a full credit of 3. "RS" represents the random sub-sampling baseline. Both MLP-S methods and MLP-B outperform the baseline method. SC is an acronym for Spectral Clustering. AP is an acronym for Affinity Propagation.
Figure 6D:
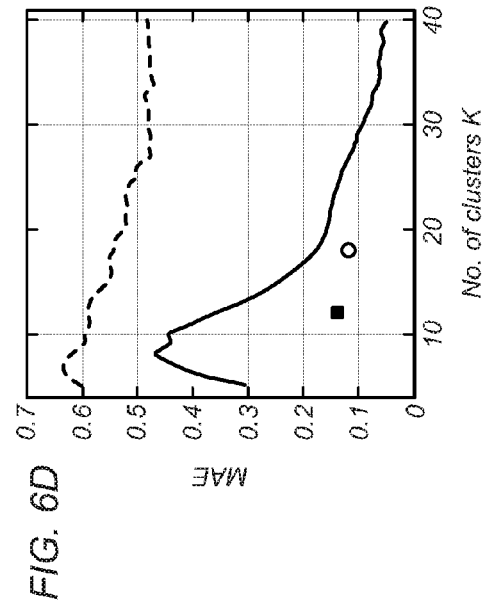
Figure 6A:
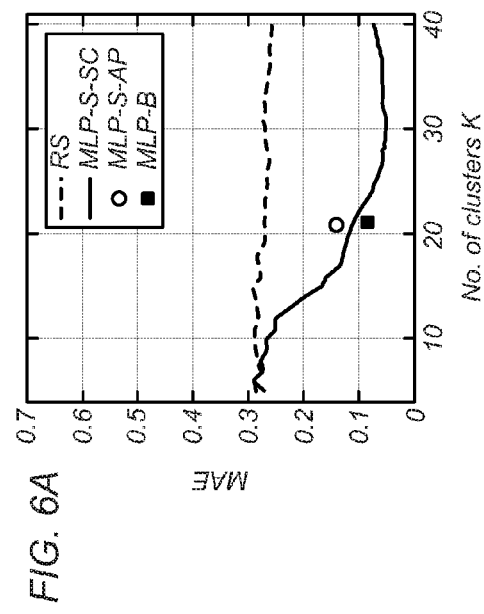
Figure 6C:
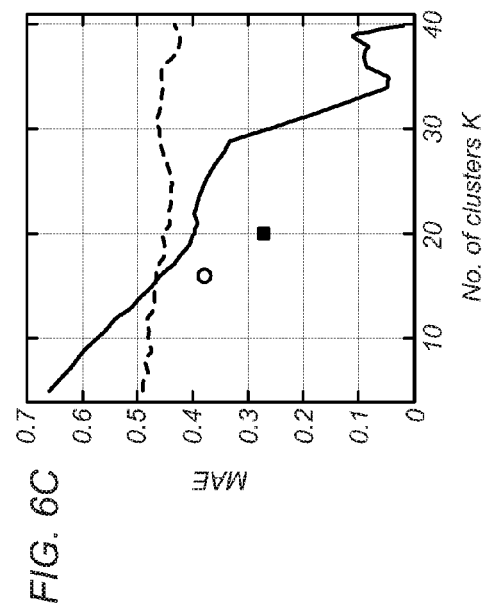

A graphical representation of our model is visualized in FIG. 5. Our goal next is to estimate the cluster assignments vector $z$ for the solutions of the learners, the parameters $\phi_k$ of each cluster, and the number of clusters $K$, from the binary-valued solution feature data matrix $Y$.

Clustering Solutions in MLP-B

In some embodiments, we may use a Gibbs sampling algorithm for posterior inference under the MLP-B model, which automatically groups solutions into clusters. We may start by applying a generic clustering algorithm (e.g., K-means, with $K$ set to a value substantially smaller than $N$, such as $K=N/10$ or $K=N/5$ or $K=N/15$) to initialize $z$, and then initialize $\Phi$ accordingly. ($\Phi$ may be initialized using step 2 below, given the initialized value of vector $z$.) Then, in each iteration of MLP-B, we may perform the following steps.

1. Sample $z$: For each solution $j$, we remove it from its current cluster and sample its cluster assignment $z_j$ from the posterior $p(z_j = k \mid z_{\neg j}, \Phi, \alpha, Y)$. Using Bayes rule, we have $$p(z_j=k \mid z_{\neg j}, \Phi, \alpha, Y) = p(z_j=k \mid z_{\neg j}, \phi_k, \alpha, y_j) \propto p(z_j=k \mid z_{\neg j}, \alpha) p(y_j \mid z_j=k, \phi_k),$$

where the symbol "$\propto$" means "is proportional to". The prior probability $p(z_j = k \mid z_{\neg j}, \alpha)$ may be given by (4). For non-empty clusters, the observed data likelihood $p(y_j \mid z_j = k, \phi_k)$ may be given by (3). However, expression (3) does not apply to new clusters that are previously empty. For a new cluster, we marginalize out $\phi_k$, resulting in $$p(y_j \mid z_j = k, \beta) = \int_{\phi_k} p(y_j \mid z_j = k, \phi_k) p(\phi_k \mid \beta) =$$

$$\int_{\phi_k} \text{Mult}(y_j \mid z_j = k, \phi_k) \text{Dir}(\phi_k \mid \beta) = \dfrac{\Gamma(V\beta)}{\Gamma\left(\sum_{i=1}^{V} Y_{i,j} + V\beta\right)} \prod_{i=1}^{V} \dfrac{\Gamma(Y_{i,j} + \beta)}{\Gamma(\beta)},$$

where $\Gamma(\cdot)$ is the Gamma function.

If a cluster becomes empty after we remove a solution from its current cluster, then we may remove it from our sampling process and erase its corresponding multinomial parameter vector $\phi_k$. (Upon removing a cluster, the value of $K$ may be decremented: $K \leftarrow K-1$.)

If a new cluster is created by virtue of sampling $z_j$ (as provided in expression (4) by the case "if cluster $k$ is empty"), then we may sample its multinomial parameter vector $\phi_k$ immediately according to Step 2 below. (Upon creation of a new cluster, the value of $K$ may be incremented: $K \leftarrow K+1$.) Otherwise, we may delay changing $\phi_k$ until we have finished sampling $z$ for all solutions.

2. Sample $\Phi$: For each cluster $k$, sample $\phi_k$ from its posterior $\text{Dir}(\phi_k \mid n_{1,k}+\beta, \ldots, n_{V,k}+\beta)$, where $n_{i,k}$ is the number of times feature $i$ occurs in the solutions that belong to cluster $k$.

3. Sample $\alpha$: Sample $\alpha$, e.g., using the approach described in [41].

4. Update $\beta$: Update $\beta$, e.g., using the fixed-point procedure described in [20].

The output of the Gibbs sampler comprises a series of samples that correspond to the approximate posterior distribution of the various parameters of interest: the cluster assignments vector $z$, the matrix $\Phi$, the parameter $\alpha$ and the parameter $\beta$. To make meaningful inference for these parameters (such as the posterior mean of a parameter), these samples are post-processed. For our estimate of the true number of clusters, $\hat{K}$, we may take the mode of the posterior distribution on the number of clusters $K$. We may use only iterations with $K = \hat{K}$ to estimate the posterior statistics [39]. The value of $K$ for any given iteration is the value of $K$ after step 1 (of that iteration) is completed.

In mixture models, the issue of "label-switching" can cause a model to be unidentifiable, because the cluster labels can be arbitrarily permuted without affecting the data likelihood. In order to overcome this issue, we may use an approach reported in [39]. First, we may compute the likelihood of the observed data in each iteration as $p(Y \mid \Phi^l, z^l)$, where $\Phi^l$ and $z^l$ represent the samples of these variables at the $l$th iteration. After the algorithm terminates, we may search for the iteration $l_{max}$ with the largest data likelihood, and then, for each iteration $l \neq l_{max}$ such that $K = \hat{K}$, permute the cluster labels of $z^l$ to best match $\Phi^l$ with $\Phi^{l_{max}}$. The permutation may be obtained in various ways. For example, starting with the index set $\text{IDX} = \{1, 2, \ldots, \hat{K}\}$, we may determine the index $k_1 \in \text{IDX}$ of the column in $\Phi^l$ that gives a maximum inner product with the first column of $\Phi^{l_{max}}$; update the index set IDX by removing $k_1$; determine the index $k_2 \in \text{IDX}$ of the column in $\Phi^l$ that gives a maximum inner product with the second column of $\Phi^{l_{max}}$; update the index set IDX by removing $k_2$; and so on. The sequence of indices $\{k_1, k_2, \ldots, k_{\hat{K}}\}$ define a permutation $\Pi_l$ that is applied to the cluster labels of $z^l$ and the columns of $\Phi^l$.

We use $\hat{\Phi}$ (with columns $\hat{\phi}_k$) to denote the estimate of $\Phi$, which is simply the posterior mean of $\Phi$. The posterior mean of $\Phi$ may be determined by averaging the permuted matrices $\{\Phi^l \Pi_l\}$, e.g., over iterations after the initial burn-in iterations.

Each solution $j$ may be assigned to the cluster indexed by the mode of the samples from the posterior of $z_j$, denoted by $\hat{z}_j$.

Auto-Grading via MLP-B

We now detail how to use MLP-B to automatically grade a large number $N$ of learners' solutions to a mathematical question, using a small number $\hat{K}$ of instructor graded solutions. First, as in MLP-S, we may select the set $I_B$ of "typical solutions" for the instructor to grade. We may construct $I_B$ by selecting one solution from each of the $\hat{K}$ clusters that is most representative of the solutions in that cluster:

$$I_B = \{\operatorname*{argmax}_j p(y_j \mid \hat{\phi}_k), k = 1, 2, \ldots, \hat{K}\}.$$

In words, for each cluster, we may select the solution with the largest likelihood of being in that cluster.

The instructor may grades the $\hat{K}$ solutions in $I_B$ to form the set of instructor grades $\{g_k\}$ for $k \in I_B$. Using these grades, we may assign grades to the other solutions $j \notin I_B$ according to $$\hat{g}_j = \frac{\sum_{k=1}^{\hat{K}} p(y_j \mid \hat{\phi}_k) g_k}{\sum_{k=1}^{\hat{K}} p(y_j \mid \hat{\phi}_k)}. \tag{5}$$

That is, we may grade each solution not in $I_B$ as the average of the instructor grades, where each instructor grade $g_k$ is weighted by the likelihood that the feature vector $y_j$ belongs to the kth cluster. We demonstrate the performance of auto-grading via MLP-B in the experimental results section below.

Feedback Generation via MLP-B

In addition to grading solutions, MLP-B can automatically provide useful feedback to learners on where they made errors in their solutions.

For a particular solution j denoted by its column feature value vector $y_j$ with $V_j$ total expressions, let $y_j^{(v)}$ denote the feature value vector that corresponds to the first v expressions in this solution, with $v \in \{1, 2, \ldots, V_j\}$. Under this notation, we may evaluate the probability that the first v expressions of solution j belong to each of the $\hat{K}$ clusters:

$$p(y_j^{(v)} \mid \hat{\phi}_k), k=1,2,\ldots, \hat{K}, \text{ for all } v.$$

Using these probabilities, we may also compute the expected credit of solution j after the first v expressions via $$\hat{g}_j^{(v)} = \frac{\sum_{k=1}^{\hat{K}} p(y_j^{(v)} \mid \hat{\phi}_k) g_k}{\sum_{k=1}^{\hat{K}} p(y_j^{(v)} \mid \hat{\phi}_k)}, \tag{6}$$

where $\{g_k\}$ is the set of instructor grades as defined above.

Using these quantities, we may identify that the jth learner has likely made an error at the with expression of his/her solution if it is most likely to belong to a cluster with credit $g_k$ less than the full credit or, alternatively, if the expected credit $\hat{g}_j^{(v)}$ is less than the full credit.

The ability to automatically locate where an error has been made in a particular incorrect solution provides many benefits. For example, MLP-B may inform instructors of the most common locations of learner errors to help guide their instruction. As another example, MLP-B may enable an automated tutoring system to generate feedback to a learner as they make an error in the early steps of a solution, before it propagates to later steps. We demonstrate the efficacy of MLP-B to automatically locate learner errors using real-world educational data in the experiments section below.

Use of Metadata from Correction Solution(s) as Feedback to Learner(s)

In the discussion above, we proposed to use MLP-B to automatically generate feedback to the learner (or the instructor) on the likely location of the error in the learner's solution. While this form of feedback is obviously very useful, it only diagnoses "where" the learner has made an error, not "why" the learner has made the error. We propose two possible ways to achieve the latter. First, we can make use of other metadata (i.e., metadata other than the mathematical expressions). For example, some learners write text between expressions to explain which particular concepts/skills they have applied between consecutive steps (expressions). Once the system identifies that a learner X has likely made an error at a particular expression of his/her solution, the system can copy the text written down between the previous expression and the particular expression in one or more correct solutions, and generate a hint by providing the learner X with the copied text. The provided text gives the learner X a hint on how to proceed. Even without using the textual metadata, we can analyze one or more correct solutions that share the same expressions as the current solution before the error location, and output the next expression (after the particular expression) in one or more of these correct solutions, as a hint to learner X.

Incremental Operation of MLP-B

In some embodiments, MLP-B may be operated in an "incremental" fashion if the same question is used in multiple runs of a class (or course of instruction). Specifically, in a first run of the class, MLP-B may be used to create initial clusters of learner solutions, and estimate solution-cluster assignment variables $\{z_j\}$ and cluster feature vectors $\{\phi_k\}$. Then, in a second run of the class, a new set of solutions to the same question is obtained, e.g., from a new set of learners. For each new solution, we may calculate the likelihood that the new solution belongs to each initial cluster, without needing to change the clustering assignments of the old solutions (i.e., the solutions from the first run). The calculated likelihoods may be used to assign a grade to the new solution using equation (5) and the cluster-representative grades provided by the instructor(s) in the first run of the class. Thus, grades for the new solutions may be efficiently obtained based on the investment of instructor grading effort in the first run. Furthermore, in some embodiments, using CRP, we may create a relatively small number of new clusters in the second run, where the new clusters represent different solution types than those represented by the initial clusters. (The new clusters allow for the possibility that new types of solution may appear in the second run.) Thus, the instructor only needs to grade the relatively small number of representative solutions for the new clusters. In a succession of class runs, one can expect the number of newly-appearing solution types to decrease. Accordingly, the system may decrease the number of new clusters as a function of the class run index. Therefore, the amount of human effort required to grade representative solutions decreases as time goes on.

Encoding Expression Frequencies in the Feature Vector

In some of the above described embodiments, we have chosen to represent each solution by a binary-valued vector $y_j$: each entry in $y_j$ indicates whether or not solution j contains a particular mathematical expression. However, in contexts where multiple appearances of the same expression are meaningful, our approach may be applied given that each entry of the vector $y_j$ is a non-negative integer corresponding to how many times an expression occurs in solution j. MLP-B remains unaffected; MLP-S would require an alternative similarity metric. Possible alternatives include the cosine similarity metric $$S_{i,j} = \frac{\langle y_i, y_j \rangle}{\|y_j\|^2 \|y_j\|^2},$$

and the Gaussian kernel metric $$S_{i,j} = \exp\left(-\frac{1}{2}\|y_i - y_j\|_2^2\right).$$

Replacing the l2 norm with l1 norm in these metrics would also work.

Experiments

In this section, we demonstrate how MLP-S and MLP-B can be used to accurately estimate the grades of roughly 100 open response solutions to mathematical questions by only asking the course instructor to grade approximately 10 solutions. We also demonstrate how MLP-B can be used to automatically provide feedback to learners on the locations of errors in their solutions. (While the experiments discussed in this section involve specific values for various algorithmic parameters, the principles of the present invention are not limited to such specific values.)

Auto-Grading via MLP-S and MLP-B

Datasets: In one experiment, our dataset comprises 116 learners solving 4 open response mathematical questions in an edX course. The set of questions includes 2 high-school level mathematical questions and 2 college-level signal processing questions. The question statements are as follows.

Question 1: Multiply $(x^2+x+\sin^2 x+\cos^2 x)(2x-3)$, and simplify your answer as much as possible.

Question 2: Find the derivative of $$\frac{x^3 + \sin x}{e^x}$$

and simplify your answer as much as possible.

Question 3: A discrete-time linear time-invariant system has the impulse response shown in the figure (omitted). Calculate $H(e^{jw})$, the discrete-time Fourier transform of h[n]. Simplify your answer as much as possible until it has no summations.

Question 4: Evaluate the following summation $\Sigma_{k=-\infty}^{\infty} \delta[n-k]x[k-n]$.

The number of solutions N per question and the number of features V per question are given by Table 1 below.

TABLE 1

|  | No. of solutions N | No. of features (unique expressions) V |
|---|---|---|
| Question 1 | 108 | 78 |
| Question 2 | 113 | 53 |
| Question 3 | 90 | 100 |
| Question 4 | 110 | 45 |

For each question, we pre-process the solutions to filter out the blank solutions and extract features. Using the features, we represent the solutions by the matrix Y in (1). Every solution was graded by the course instructor with one of the scores in the set {0,1,2,3}, with a full credit of 3.

Random Sub-Sampling as Baseline Method: We compare the auto-grading performance of MLP-S and MLP-B against a baseline method that does not group the solutions into clusters. In this baseline method, we randomly sub-sample all solutions to form a small set of solutions for the instructor to grade. Then, each ungraded solution is simply assigned the grade of the solution in the set of instructor-graded solutions that is most similar to it as defined by S in (2). Since this small set is picked randomly, we run the baseline method 10 times and report the best performance. (Other baseline methods, such as the linear regression-based method used in the edX essay grading system [33], are not listed, because they did not perform as well as random sub-sampling in our experiments.)

Experimental Setup: For each question, we apply four different methods for auto-grading, as follows.

1. Random sub-sampling (RS) with the number of clusters $K \in \{5,6,\ldots,40\}$.
2. MLP-S with spectral clustering (SC) with $K \in \{5,6,\ldots,40\}$.
3. MLP-S with affinity propagation (AP) clustering. This algorithm does not require K as an input.
4. MLP-B with hyperparameters set to the non-informative values $\alpha_\alpha = \alpha_\beta = 1$ and running the Gibbs sampling algorithm for 10,000 iterations with 2,000 burn-in iterations.

MLP-S with AP and MLP-B both automatically estimate the number of clusters K. Once the clusters are selected, we assign one solution from each cluster to be graded by the instructor using the methods described in earlier sections.

Performance Metric: We use mean absolute error (MAE), which measures the "average absolute error per auto-graded solution"

$$MAE = \frac{\sum_{j=1}^{N-K} |\hat{g}_j - g_j|}{N-K},$$

as our performance metric. Here, N−K equals the number of solutions that are auto-graded, and $\hat{g}_j$ and $g_j$ represent the estimated grade (for MLP-B, the estimated grades are rounded to integers) and the actual instructor grades for the auto-graded solutions, respectively.

Results and Discussion: In FIG. 6A-6D, we plot the MAE versus the number of clusters K for Questions 1-4. MLP-S with SC consistently outperforms the random sampling baseline algorithm for almost all values of K. This performance gain is likely due to the fact that the baseline method does not cluster the solutions and thus does not select a good subset of solutions for the instructor to grade. MLP-B is more accurate than MLP-S with both SC and AP and can automatically estimate the value of K, although at the price of significantly higher computational complexity. (For example, clustering and auto-grading one question takes 2 minutes for MLP-B compared to only 5 seconds for MLP-S with AP on a standard laptop computer with a 2.8 GHz CPU and 8 GB memory).

Both MLP-S and MLP-B grade the learners' solutions accurately (e.g., an MAE of 0.04 out of the full grade 3 using only K=13 instructor grades to auto-grade all N=113 solutions to Question 2). Moreover, as we see in FIGS. 6A-6D, the MAE for MLP-S decreases as K increases, and eventually reaches 0 when K is large enough that only solutions that are exactly the same as each other belong to the same cluster. In practice, one can tune the value of K to achieve a balance between maximizing grading accuracy and minimizing human effort. Such a tuning process is not necessary for MLP-B, since it automatically estimates the value of K and achieves such a balance.

Feedback Generation via MLP-B

Experimental Setup: Since Questions 3-4 require some familiarity with signal processing, we demonstrate the efficacy of MLP-B in providing feedback on mathematical solutions on Questions 1-2. Among the solutions to each question, there are a few types of common errors that more than one learner makes. We take one incorrect solution out of each type and run MLP-B on the other solutions to estimate the parameter $\hat{\phi}_k$ for each cluster. Using this information and the instructor grades $\{g_k\}$, after each expression v in a solution, we compute the probability that it belongs to a cluster $p(y_j|\hat{\phi}_k)$ that does not have full credit ($g_k<3$), together with the expected credit using (6). Once the expected grade is calculated to be less than full credit, we consider that an error has occurred.

Results and Discussion: Two sample feedback generation processes are shown in FIGS. 7A and 7B. As shown in FIG. 7A, we can provide feedback to the learner on their error as early as Line 2, before it carries over to later lines. Thus, MLP-B can potentially become a powerful tool to generate timely feedback to learners as they are solving mathematical questions, by analyzing the solutions it gathers from other learners.

Conclusions

We have developed a framework for mathematical language processing (MLP). In some embodiments, the framework includes the following steps: (i) converting each solution to an open response mathematical question into a series of numerical features; (ii) clustering the features from several solutions to uncover the structures of correct, partially correct, and incorrect solutions; and (iii) automatically grading the remaining (potentially large number of) solutions based on their assigned cluster and one instructor-provided grade per cluster. As our experiments have indicated, our framework can substantially reduce the human effort required for grading in large-scale courses. As a bonus, MLP-S enables instructors to visualize the clusters of solutions to help them identify common errors, and thus, groups of learners having the same misconceptions. As a further bonus, MLP-B can track the cluster assignment of each step of a multistep solution and determine when it departs from a cluster of correct solutions, which enables us to indicate the locations of errors to learners in real time. Improved learning outcomes should result from these innovations.

In some embodiments, the feature extraction step may be extended to take into account both the ordering of expressions and ancillary text in a solution.

In some embodiments, clustering algorithms that allow a solution to belong to more than one cluster could make MLP more robust to outlier solutions and further reduce the number of solutions that the instructors need to grade.

REFERENCES

1. Attali, Y., "Construct Validity of e-rater® in Scoring TOEFL Essays", Research Report, Educational Testing Service, RR-07-21, May 2007.
2. Basu, S., Jacobs, C., and Vanderwende, L., "Powergrading: A Clustering Approach to Amplify Human Effort for Short Answer Grading", Trans. Association for Computational Linguistics 1 (October 2013), 391-402.
3. Blei, D., Griffiths, T., and Jordan, M., "The Nested Chinese Restaurant Process and Bayesian Nonparametric Inference of Topic Hierarchies", J. ACM 57, 2 (January 2010), 7:1-7:30.
4. Blei, D. M., Ng, A. Y., and Jordan, M. I., "Latent Dirichlet Allocation", J. Machine Learning Research 3 (January 2003), 993-1022.
5. Brooks, M., Basu, S., Jacobs, C., and Vanderwende, L., "Divide and Correct: Using Clusters to Grade Short Answers at Scale", In Proc. 1st ACM Conf. on Learning at Scale (March 2014), 89-98.
6. Champaign, J., Colvin, K., Liu, A., Fredericks, C., Seaton, D., and Pritchard, D., "Correlating skill and improvement in 2 MOOCs with a student's time on tasks", In Proc. 1st ACM Conf. on Learning at Scale (March 2014), 11-20.
7. Coursera. https://www.coursera.org/, 2014.
8. Cramer, M., Fisseni, B., Koepke, P., Kühlwein, D., Schröder, B., and Veldman, J., "The Naproche Project—Controlled natural language proof checking of mathematical texts", June 2010.
9. Dijksman, J. A., and Khan, S., "Khan Academy: The world's free virtual school", In APS Meeting Abstracts (March 2011).
10. edX. https://www.edx.org/, 2014.
11. Frey, B. J., and Dueck, D., "Clustering by passing messages between data points", Science 315, 5814 (2007), 972-976.
12. Galenson, J., Reames, P., Bodik, R., Hartmann, B., and Sen, K., "CodeHint: Dynamic and interactive synthesis of code snippets", In Proc. 36th Intl. Conf. on Software Engineering (June 2014), 653-663.
13. Gelman, A., Carlin, J., Stern, H., Dunson, D., Vehtari, A., and Rubin, D., "Bayesian Data Analysis", CRC Press, 2013.
14. Griffiths, T., and Tenenbaum, J., "Hierarchical Topic Models and the Nested Chinese Restaurant Process", Advances in Neural Information Processing Systems 16 (December 2004), 17-24.
15. Gulwani, S., Radiček, I., and Zuleger, F., "Feedback generation for performance problems in introductory programming assignments", In Proc. 22nd ACM SIGSOFT Intl. Symposium on the Foundations of Software Engineering (November 2014).
16. Guo, P., and Reinecke, K., "Demographic differences in how students navigate through MOOCs", In Proc. 1st ACM Conf. on Learning at Scale (March 2014), 21-30.
17. Kang, S., McDermott, K., and Roediger III, H., "Test format and corrective feedback modify the effect of testing on long-term retention", European J. Cognitive Psychology 19, 4-5 (July 2007), 528-558.
18. Lord, F., "Applications of Item Response Theory to Practical Testing Problems", Erlbaum Associates, 1980.
19. Megill, N., "Metamath: A Computer Language for Pure Mathematics", Citeseer, 1997.
20. Minka, T., "Estimating a Dirichlet Distribution", Tech. Report, MIT, November 2000.
21. Naumowicz, A., and Korniłowicz, A., "A brief overview of MIZAR. In Theorem Proving in Higher Order Logics", vol. 5674 of Lecture Notes in Computer Science. August 2009, 67-72.
22. Ng, A., Jordan, M., and Weiss, Y., "On Spectral Clustering: Analysis and an Algorithm", Advances in Neural Information Processing Systems 2 (December 2002), 849-856.
23. Nguyen, A., Piech, C., Huang, J., and Guibas, L., "Codewebs: Scalable homework search for massive open online programming courses", In Proc. 23rd Intl. World Wide Web Conference (Seoul, Korea, April 2014), 491-502.
24. OpenStaxTutor, https://openstaxtutor.org/, 2013.
25. Piech, C., Huang, J., Chen, Z., Do, C., Ng, A., and Koller, D "Tuned models of peer assessment in MOOCs", In Proc. 6th Intl. Conf. on Educational Data Mining (July 2013), 153-160.
26. Raman, K., and Joachims, T., "Methods for ordinal peer grading", In Proc. 20th ACM SIGKDD Intl. Conf. on Knowledge Discovery and Data Mining (August 2014), 1037-1046.
27. Rasch, G., "Probabilistic Models for Some Intelligence and Attainment Tests", MESA Press, 1993.
28. Rivers, K., and Koedinger, K., "A Canonicalizing Model for Building Programming Tutors", In Proc. 11th Intl. Conf. on Intelligent Tutoring Systems (June 2012), 591-593.
29. Rivers, K., and Koedinger, K., "Automating hint generation with solution space path construction", In Proc. 12th Intl. Conf. on Intelligent Tutoring Systems (June 2014), 329-339.
30. Sadler, P., and Good, E., "The Impact of Self- and Peer-Grading on Student Learning", Educational Assessment 11, 1 (June 2006), 1-31.
31. Sapling Learning, http://www.saplinglearning com/, 2014.
32. Singh, R., Gulwani, S., and Solar-Lezama, A., "Automated feedback generation for introductory programming assignments", In Proc. 34th ACM SIGPLAN Conf. on Programming Language Design and Implementation, vol. 48 (June 2013), 15-26.
33. Southavilay, V., Yacef, K., Reimann, P., and Calvo, R., "Analysis of collaborative writing processes using revision maps and probabilistic topic models", In Proc. 3rd Intl. Conf. on Learning Analytics and Knowledge (April 2013), 38-47.
34. Srikant, S., and Aggarwal, V., "A system to grade computer programming skills using machine learning", In Proc. 20th ACM SIGKDD Intl. Conf. on Knowledge Discovery and Data Mining (August 2014), 1887-1896.
35. Steyvers, M., and Griffiths, T., "Probabilistic topic models", Handbook of Latent Semantic Analysis 427, 7 (2007), 424-440.
36. SymPy Development Team, "SymPy: Python library for symbolic mathematics", 2014. http://www.sympy.org.
37. Teh, Y., "Dirichlet Process", In Encyclopedia of Machine Learning Springer, 2010, 280-287.
38. Vats, D., Studer, C., Lan, A. S., Carin, L., and Baraniuk, R. G., "Test size reduction for concept estimation", In Proc. 6th Intl. Conf. on Educational Data Mining (July 2013), 292-295.
39. Waters, A., Fronczyk, K., Guindani, M., Baraniuk, R., and Vannucci, M., "A Bayesian nonparametric approach for the analysis of multiple categorical item responses", J. Statistical Planning and Inference (2014, In press).
40. WebAssign, https://webassign.com/, 2014.
41. West, M., "Hyperparameter Estimation in Dirichlet Process Mixture Models", Tech. Report, Duke University, 1992.
42. Wilkowski, J., Deutsch, A., and Russell, D., "Student skill and goal achievement in the mapping with Google MOOC", In Proc. 1st ACM Conf. on Learning at Scale (March 2014), 3-10.
43. Woolf, B. P., "Building Intelligent Interactive Tutors: Student-centered Strategies for Revolutionizing E-learning", Morgan Kaufman Publishers, 2008.
44. Yin, J., and Wang, J., "A Dirichlet multinomial mixture model-based approach for short text clustering", In Proc. 20th ACM SIGKDD Intl. Conf. on Knowledge Discovery and Data Mining (August 2014), 233-242.

Method 800

Figure 8:
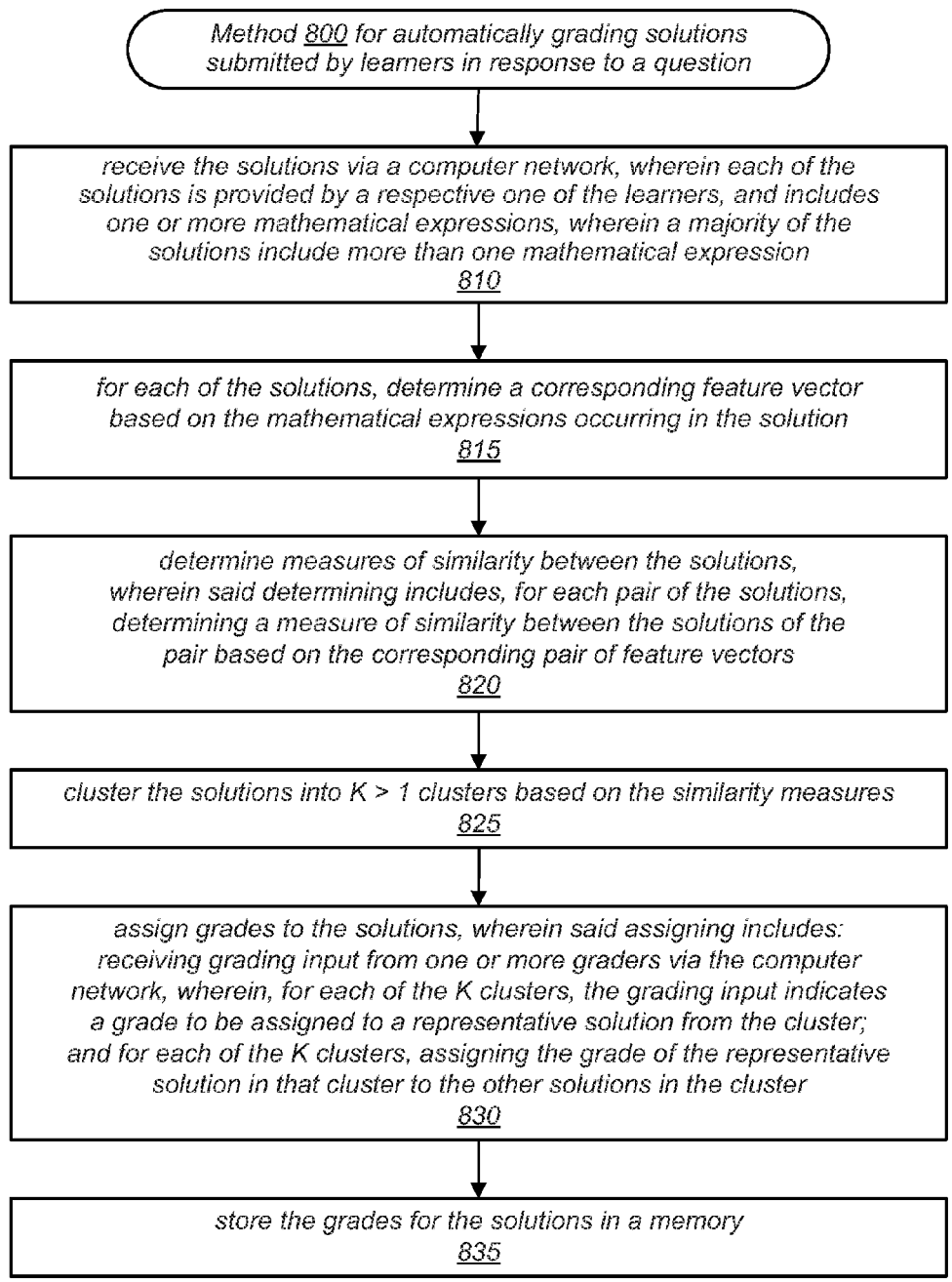
FIG. 8 illustrates one embodiment of a method for automatically grading solutions submitted by learners in response to a question, according to some embodiments.

In one set of embodiments, a method 800 may include the operations shown in FIG. 8. (The method 800 may also include any subset of the features, elements and embodiments described above.) The method 800 may be used to automatically grade solutions submitted by learners in response to a question. It should be understood that various embodiments of method 800 are contemplated, e.g., embodiments in which one or more of the illustrated operations are omitted, embodiments in which the illustrated operations are augmented with one or more additional operations, embodiments in which one or more of the illustrated operations are parallelized, etc. The method 800 may be implemented by a computer system (or more generally, by a set of one or more computer systems). In some embodiments, the method 800 may be performed by an educational service provider, e.g., an Internet-based educational service provider.

At 810, a computer system may receive the solutions via a computer network, wherein each of the solutions is provided by a respective one of the learners, and includes one or more mathematical expressions, wherein a majority of the solutions include more than one mathematical expression.

At 815, for each of the solutions, the computer system may determine a corresponding feature vector based on the mathematical expressions occurring in the solution.

At 820, the computer system may determine measures of similarity between the solutions, wherein said determining includes, for each pair of the solutions, determining a measure of similarity between the solutions of the pair based on the corresponding pair of feature vectors.

At 825, the computer system may cluster the solutions into K>1 clusters based on the similarity measures.

At 830, the computer system may assign grades to the solutions, where said assigning includes: (a) receiving grading input from one or more graders via the computer network, wherein, for each of the K clusters, the grading input indicates a grade to be assigned to a representative solution from the cluster; and for each of the K clusters, assigning the grade of the representative solution in that cluster to the other solutions in the cluster.

At 835, the computer system may store the grades for the solutions in a memory.

In some embodiments, the method 800 may also include providing a cluster diagram to an authorized party (such as the instructor) via the network. The cluster diagram may include nodes corresponding to the solutions, and edges corresponding to the measures of similarity, e.g., as various described above. Nodes belonging to different clusters may distinguished visually (e.g., by different colors, different textures, different graphic symbols, different levels of gray scale, etc.). The cluster diagram may also indicate the grade assigned to each cluster.

In some embodiments, the method 800 may also include: receiving selection input from an authorized party (e.g., the instructor) via the network, wherein the selection input selects one or more of the solutions; and providing grade information to the authorized party via the network, wherein the grade information includes the one or more solutions and their assigned grades.

In some embodiments, the method 800 may also include sending a message via the network to one of the learners, wherein the message includes at least the grade that has been assigned to the learner's solution. The method may also include a copy of the solution that was submitted by the learner.

In some embodiments, the method 800 may also include: for each of the learners, sending a corresponding message via the network to the learner, wherein the corresponding message includes at least the grade that has been assigned to the learner's solution.

In some embodiments, the method 800 may also include: prior to the action 825 of clustering the solutions, receiving the number of clusters, K, via the network from an authorized party (e.g., from the instructor).

In some embodiments, the action 825 of clustering the solutions employs a clustering algorithm that automatically determines a value for the number of clusters K.

In some embodiments, the method 800 may also include assembling a list of unique expressions occurring in a union of the solutions. (See the above discussion of the "bag of expressions" model.)

In some embodiments, the feature vector for each solution may be a binary valued vector whose components correspond respectively to expressions in the above-described list of unique expressions.

In some embodiments, the representative solution in a given one of the clusters is selected based on a maximization of a sum $\Sigma_{j=1}^{N} S_{ij}$, where $S_{ij}$ is the similarity measure between the feature vector of the ith solution and the feature vector of the jth solution, where N is the number of said solutions, where index i ranges over the solutions in the given cluster.

Method 900

Figure 9:
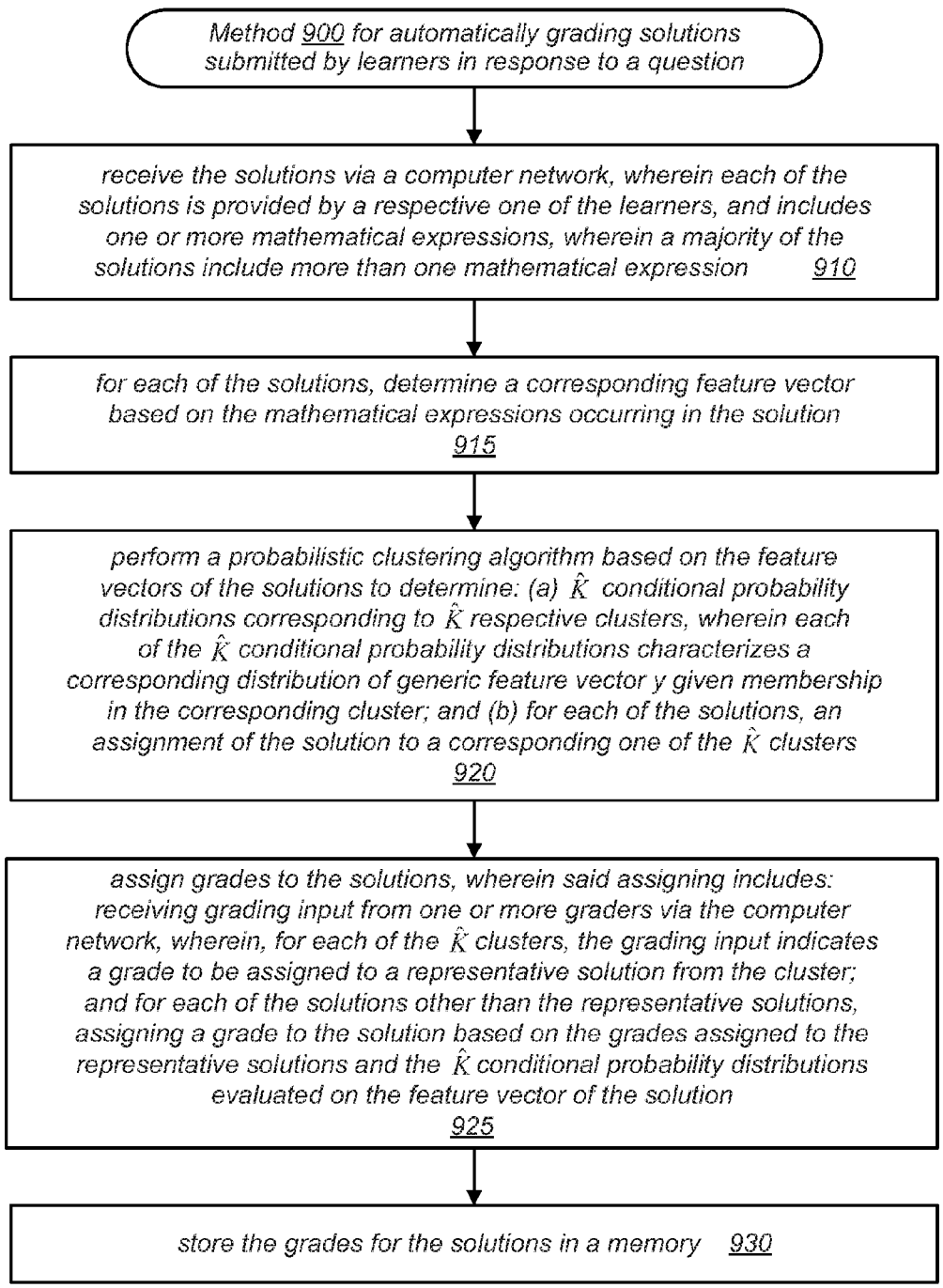
FIG. 9 illustrates a Bayesian method for automatically grading solutions submitted by learners in response to a question, according to some embodiments.

In one set of embodiments, a method 900 may include the operations shown in FIG. 9. (The method 900 may also include any subset of the features, elements and embodiments described above.) The method 900 may be used to automatically grade solutions submitted by learners in response to a question. It should be understood that various embodiments of method 900 are contemplated, e.g., embodiments in which one or more of the illustrated operations are omitted, embodiments in which the illustrated operations are augmented with one or more additional operations, embodiments in which one or more of the illustrated operations are parallelized, etc. The method 900 may be implemented by a computer system (or more generally, by a set of one or more computer systems). In some embodiments, the method 900 may be performed by an educational service provider, e.g., an Internet-based educational service provider.

At 910, the computer system may receive the solutions via a computer network, wherein each of the solutions is provided by a respective one of the learners, and includes one or more mathematical expressions, wherein a majority of the solutions include more than one mathematical expression.

At 915, for each of the solutions, the computer system may determine a corresponding feature vector based on the mathematical expressions occurring in the solution.

At 920, the computer system may perform a probabilistic clustering algorithm based on the feature vectors of the solutions to determine: (a) $\hat{K}$ conditional probability distributions corresponding to $\hat{K}$ respective clusters, wherein each of the $\hat{K}$ conditional probability distributions characterizes a corresponding distribution of generic feature vector y given membership in the corresponding cluster; and (b) for each of the solutions, an assignment of the solution to a corresponding one of the $\hat{K}$ clusters.

At 925, the computer system may assign grades to the solutions, wherein said assigning includes: receiving grading input from one or more graders via the computer network, wherein, for each of the $\hat{K}$ clusters, the grading input indicates a grade to be assigned to a representative solution from the cluster; and for each of the solutions other than the representative solutions, assigning a grade to the solution based on the grades assigned to the representative solutions and the $\hat{K}$ conditional probability distributions evaluated on the feature vector of the solution.

At 930, the computer system may store the grades for the solutions in a memory.

In some embodiments, method 900 may also include the following operations.

(1) For each v in the set $\{1, 2, \ldots, V_j\}$, determine a grade $g_v$ for a partial feature vector $y_v$ corresponding to the first v expressions in the solution of a given one of the learners, wherein said grade $g_v$ is determined based on the grades assigned to the representative solutions and the $\hat{K}$ conditional probability distributions evaluated on the partial feature vector $y_v$, where $V_j$ is the number of expressions occurring in the given learner's solution.

(2) Determine a location of a first erroneous mathematical expression in the given learner's solution based on a first value of v such that the grade $g_v$ is less than a maximal grade value.

(3) Send an error indication message to a user (e.g., the given learner or the instructor) via the computer network, wherein the error indication message indicates the location of the first erroneous mathematical expression in the given learner's solution.

In some embodiments, method 900 may also include the following operations.

(1) For each v in the set $\{1, 2, \ldots, V_j\}$, determine a maximum likelihood selection $z_v$ for cluster membership based on the $\hat{K}$ conditional probability distributions evaluated on the partial feature vector $y_v$, where $V_j$ is the number of expressions occurring in the given learner's solution.

(2) Determine a location of a first erroneous mathematical expression in the given learner's solution based on a first value of v such that the maximum likelihood selection $z_v$ departs from a cluster of correct solutions.

(3) Send an error indication message to a user (e.g., the given learner or the instructor) via the computer network, wherein the error indication message indicates the location of the first erroneous mathematical expression in the given learner's solution, i.e., "first" according to the ordering of expressions in the learner's solutions.

In some embodiments, method 900 may also include the following operations.

(1) Determine a location of a first erroneous mathematical expression in the solution of a given one of the learners.

(2) Send feedback data to the given learner via the computer network. The feedback may include: an identification of the location of the first erroneous mathematical expression in the given learner's solution; and explanatory text extracted from one or more different solutions provided by one or more different ones of the learners, wherein the one or more different solutions occur in a cluster of correct solutions, wherein the explanatory text has been extracted from the one or more different solutions based on the location of the first erroneous mathematical expression in the given learner's solution.

In some embodiments, method 900 may also include the following operations.

(1) Determine a location of a first erroneous mathematical expression in the solution of a given one of the leaners.

(2) Identify one or more correct solutions from a cluster of correct solutions such that each of the one or more correct solutions shares the same mathematical expressions with the given learner's solution prior to the location of the first erroneous mathematical expression.

(3) Send feedback data to the given learner via the computer network. The feedback data may include a mathematical expression extracted from a selected one of the one or more correct solutions, wherein the extracted mathematical expression has the same location in the selected solution as the location of the first erroneous mathematical expression in the given learner's solution.

In some embodiments, method 900 may also include the following operations.

(1) Receive additional solutions from additional learners via the computer network, wherein each of the additional solutions is provided by a respective one of the additional learners.

(2) For each of the additional solutions, Determine a corresponding feature vector based on the mathematical expressions occurring in the additional solution.

(3) Assign grades to the additional solutions by performing operations including, for each of the additional solutions, assigning a grade to the additional solution based on the grades assigned to the representative solutions and said $\hat{K}$ conditional probability distributions evaluated on the feature vector of the additional solution.

(4) Store the grades for the additional solutions in the memory.

In some embodiments, method 900 may also include the following operations.

(1) Receive additional solutions from additional learners via the computer network, wherein each of the additional solutions is provided by a respective one of the additional learners.

(2) For each of the additional solutions, determine a corresponding feature vector based on the mathematical expressions occurring in the additional solution.

(3) Perform the probabilistic clustering algorithm based on the feature vectors of the solutions and the feature vectors of the additional solutions, in order to determine: (c) $\Delta K$ additional probability distributions corresponding respectively to $\Delta K$ new clusters that are different from the $\hat{K}$ clusters, wherein each of the $\Delta K$ additional probability distributions characterizes a corresponding distribution of generic feature vector y given membership in a corresponding one of the $\Delta K$ new clusters; and (d) for each of the additional solutions, an assignment of the additional solution to a corresponding cluster in the $\hat{K}+\Delta K$ clusters comprising the $\hat{K}$ clusters and the $\Delta K$ new clusters.

(4) Assign grades to the additional solutions, wherein said assigning grades to the additional solutions includes: receiving additional grading input via the computer network, wherein, for each of the $\Delta K$ new clusters, the additional grading input indicates a grade to be assigned to a representative solution from the new cluster; and for each of the additional solutions other than the representative solutions of the new clusters, assigning a grade to the additional solution based on: the grades assigned to the representative solutions of the $\hat{K}$ clusters and the $\Delta K$ new clusters; the $\hat{K}$ conditional probability distributions evaluated on the feature vector of the additional solution; and $\Delta K$ additional probability distributions evaluated on the feature vector of the additional solution.

(5) Store the grades for the additional solutions in the memory.

In some embodiments, the method 900 may also include: receiving selection input from an authorized party (e.g., the instructor) via the network, wherein the selection input selects one or more of the solutions; and providing grade information to the authorized party via the network, wherein the grade information includes the one or more solutions and their assigned grades.

In some embodiments, the method 900 may also include sending a message via the network to one of the learners, wherein the message includes at least the grade that has been assigned to the learner's solution. The method may also include a copy of the solution that was submitted by the learner.

In some embodiments, the method 900 may also include: for each of the learners, sending a corresponding message via the network to the learner, wherein the corresponding message includes at least the grade that has been assigned to the learner's solution.

In some embodiments, the method 900 may also include assembling a list of unique expressions occurring in a union of the solutions. (See the above discussion of the "bag of expressions" model.)

In some embodiments, the feature vector for each solution may be a binary valued vector (or a vector having non-negative integer values) whose components correspond respectively to expressions in the list of unique expressions.

Computer System

Figure 10:
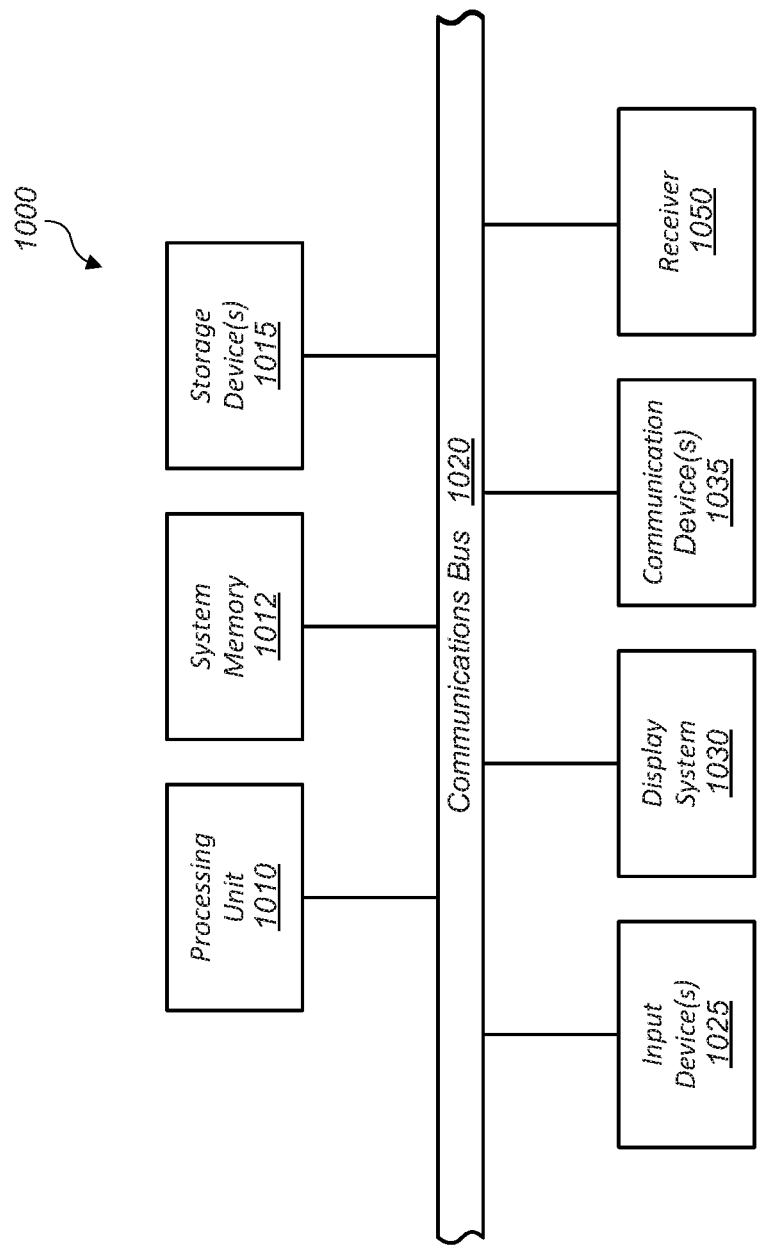
FIG. 10 illustrates one embodiment of a computer system that may be used to implement any of the embodiments described herein.

FIG. 10 illustrates one embodiment of a computer system 1000 that may be used to perform any of the method embodiments described herein, or, any combination of the method embodiments described herein, or any subset of any of the method embodiments described herein, or, any combination of such subsets.

Computer system 1000 may include a processing unit 1010, a system memory 1012, a set 1015 of one or more storage devices, a communication bus 1020, a set 1025 of input devices, and a display system 1030.

System memory 1012 may include a set of semiconductor devices such as RAM devices (and perhaps also a set of ROM devices).

Storage devices 1015 may include any of various storage devices such as one or more memory media and/or memory access devices. For example, storage devices 1015 may include devices such as a CD/DVD-ROM drive, a hard disk, a magnetic disk drive, a magnetic tape drive, semiconductor-based memory, etc.

Processing unit 1010 is configured to read and execute program instructions, e.g., program instructions stored in system memory 1012 and/or on one or more of the storage devices 1015. Processing unit 1010 may couple to system memory 1012 through communication bus 1020 (or through a system of interconnected busses, or through a computer network). The program instructions configure the computer system 1000 to implement a method, e.g., any of the method embodiments described herein, or, any combination of the method embodiments described herein, or, any subset of any of the method embodiments described herein, or any combination of such subsets.

Processing unit 1010 may include one or more processors (e.g., microprocessors).

One or more users may supply input to the computer system 100 through the input devices 1025. Input devices 1025 may include devices such as a keyboard, a mouse, a touch-sensitive pad, a touch-sensitive screen, a drawing pad, a track ball, a light pen, a data glove, eye orientation and/or head orientation sensors, a microphone (or set of microphones), an accelerometer (or set of accelerometers), or any combination thereof.

The display system 1030 may include any of a wide variety of display devices representing any of a wide variety of display technologies. For example, the display system may be a computer monitor, a head-mounted display, a projector system, a volumetric display, or a combination thereof. In some embodiments, the display system may include a plurality of display devices. In one embodiment, the display system may include a printer and/or a plotter.

In some embodiments, the computer system 1000 may include other devices, e.g., devices such as one or more graphics accelerators, one or more speakers, a sound card, a video camera and a video card, a data acquisition system.

In some embodiments, computer system 1000 may include one or more communication devices 1035, e.g., a network interface card for interfacing with a computer network (e.g., the Internet). As another example, the communication device 1035 may include one or more specialized interfaces for communication via any of a variety of established communication standards or protocols or physical transmission media.

The computer system 1000 may be configured with a software infrastructure including an operating system, and perhaps also, one or more graphics APIs (such as OpenGL®, Direct3D, Java 3D™).

Any of the various embodiments described herein may be realized in any of various forms, e.g., as a computer-implemented method, as a computer-readable memory medium, as a computer system, etc. A system may be realized by one or more custom-designed hardware devices such as ASICs, by one or more programmable hardware elements such as FPGAs, by one or more processors executing stored program instructions, or by any combination of the foregoing.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a mobile device, a wearable computer, a computer embedded in a living organism, etc.

Any of the various embodiments described herein may be combined to form composite embodiments. Furthermore, any of the various features, embodiments and elements described in U.S. Provisional Application 62/091,342 (filed Dec. 12, 2014) may be combined with any of the various embodiments described herein to form composite embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for operating a computer in order to automatically grade solutions submitted by learners in response to a question, the method comprising:
    receiving the solutions via a computer network, wherein each of the received solutions is provided by a respective one of the learners, and includes one or more mathematical expressions, wherein a majority of the received solutions include more than one mathematical expression;
    assembling a list of unique expressions occurring in a union of the received solutions;
    for each of the received solutions, automatically determining a corresponding feature vector based on the mathematical expressions occurring in the received solution, wherein the feature vector for each received solution is a binary valued vector whose components correspond respectively to expressions in the list of unique expressions;
    automatically determining measures of similarity between the received solutions, wherein said automatically determining measures of similarity between the received solutions includes, for each pair of the received solutions, automatically determining a measure of similarity between the received solutions of the pair based on the corresponding pair of feature vectors;
    automatically clustering the received solutions into K>1 clusters based on the similarity measures;
    for each of the K clusters:
        receiving grading input from one or more graders via the computer network, wherein the grading input indicates a grade to be assigned to a representative received solution in the cluster; and
        automatically assigning the grade of the representative received solution in the cluster to the other received solutions in the cluster; and
    storing the grades for the received solutions in a memory.

2. The method of claim 1, further comprising:
    providing a cluster diagram to an authorized party via the network, wherein the cluster diagram includes nodes corresponding to the received solutions, and edges corresponding to the measures of similarity, wherein nodes belonging to different clusters are distinguished visually, wherein the cluster diagram also indicates the grade assigned to each cluster.

3. The method of claim 1, further comprising:
    receiving selection input from an authorized party via the network, wherein the selection input selects one or more of the received solutions;
    providing grade information to the authorized party via the network, wherein the grade information includes the one or more received solutions and their assigned grades.

4. The method of claim 1, further comprising:
    sending a message via the network to one of the learners, wherein the message includes at least the grade that has been assigned to the solution received from the learner.

5. The method of claim 1, further comprising:
    for each of the learners, sending a corresponding message via the network to the learner, wherein the corresponding message includes at least the grade that has been assigned to the solution received from the respective learner.

6. The method of claim 1, further comprising:
prior to said clustering, receiving the number of clusters K via the network from an authorized party.

7. The method of claim 1, wherein said clustering employs a clustering algorithm that automatically determines a value for the number of clusters K.

8. The method of claim 1, wherein the representative received solution in a given one of the clusters is selected based on a maximization of a sum $\Sigma_{j=1}^{N} S_{ij}$, where $S_{ij}$ is the similarity measure between the feature vector of the $i^{th}$ received solution and the feature vector of the $j^{th}$ received solution, where N is the number of said received solutions, where the index i ranges over the received solutions in the given cluster.

9. A non-transitory memory medium for operating a computer in order to automatically grade solutions submitted by learners in response to a question, wherein the memory medium stores program instructions, wherein the program instructions, when executed by the computer, cause the computer to implement:
receiving the solutions via a computer network, wherein each of the received solutions is provided by a respective one of the learners, and includes one or more mathematical expressions, wherein a majority of the received solutions include more than one mathematical expression;
assembling a list of unique expressions occurring in a union of the received solutions;
for each of the received solutions, automatically determining a corresponding feature vector based on the mathematical expressions occurring in the received solution, wherein the feature vector for each received solution is a binary valued vector whose components correspond respectively to expressions in the list of unique expressions;
automatically determining measures of similarity between the received solutions, wherein said automatically determining measures of similarity between the received solutions includes, for each pair of the received solutions, automatically determining a measure of similarity between the received solutions of the pair based on the corresponding pair of feature vectors;
automatically clustering the received solutions into K>1 clusters based on the similarity measures;
for each of the K clusters:
receiving grading input from one or more graders via the computer network, wherein the grading input indicates a grade to be assigned to a representative received solution in the cluster; and
automatically assigning the grade of the representative received solution in the cluster to the other received solutions in the cluster; and
storing the grades for the received solutions in a memory.

10. The non-transitory memory medium of claim 9, wherein the program instructions, when executed by the computer, further cause the computer to implement:
providing a cluster diagram to an authorized party via the network, wherein the cluster diagram includes nodes corresponding to the received solutions, and edges corresponding to the measures of similarity, wherein nodes belonging to different clusters are distinguished visually, wherein the cluster diagram also indicates the grade assigned to each cluster.

11. A method for operating a computer in order to automatically grade solutions submitted by learners in response to a question, the method comprising:
receiving the solutions via a computer network, wherein each of the received solutions is provided by a respective one of the learners, and includes one or more mathematical expressions, wherein a majority of the received solutions include more than one mathematical expression;
assembling a list of unique expressions occurring in a union of the received solutions;
for each of the received solutions, automatically determining a corresponding feature vector based on the mathematical expressions occurring in the received solution, wherein the feature vector for each received solution is a binary valued vector whose components correspond respectively to expressions in the list of unique expressions;
automatically performing a probabilistic clustering algorithm based on the feature vectors of the received solutions to determine:
(a) $\hat{K}$ conditional probability distributions corresponding to $\hat{K}$ respective clusters, wherein each of the $\hat{K}$ conditional probability distributions characterizes a corresponding distribution of generic feature vector y given membership in the corresponding cluster; and
(b) for each of the received solutions, an assignment of the received solution to a corresponding one of the $\hat{K}$ clusters;
for each of the $\hat{K}$ clusters, receiving grading input from one or more graders via the computer network, wherein each grading input indicates a grade to be assigned to a representative received solution in a respective cluster of the $\hat{K}$ clusters;
for each of the received solutions other than the representative received solutions:
automatically assigning a grade to the received solution based on the grades assigned to the representative received solutions and the $\hat{K}$ conditional probability distributions evaluated on the feature vector of the received solution; and
storing the grades for the received solutions in a memory.

12. The method of claim 11, further comprising:
for each v in the set $\{1, 2, \ldots, V_j\}$, determining a grade $g_v$ for a partial feature vector $y_v$ corresponding to the first v expressions in the received solution of a given one of the learners, wherein said grade $g_v$ is determined based on the grades assigned to the representative received solutions and the $\hat{K}$ conditional probability distributions evaluated on the partial feature vector $y_v$, where $V_j$ is the number of expressions occurring in the solution provided by the given learner;
determining a location of a first erroneous mathematical expression in the solution provided by the given learner based on a first value of v such that the grade $g_v$ is less than a maximal grade value; and
sending an error indication message to a user via the computer network, wherein the error indication message indicates the location of the first erroneous mathematical expression in the solution provided by the given learner.

13. The method of claim 11, further comprising:
for each v in the set $\{1, 2, \ldots, V_j\}$, determining a maximum likelihood selection $z_v$ for cluster membership based on the $\hat{K}$ conditional probability distributions evaluated on the partial feature vector $y_v$, where $V_j$ is the number of expressions occurring in the solution provided by the given learner;

determining a location of a first erroneous mathematical expression in the solution provided by the given learner based on a first value of v such that the maximum likelihood selection $z_v$ departs from a cluster of correct solutions; and sending an error indication message to a user via the computer network, wherein the error indication message indicates the location of the first erroneous mathematical expression in the solution provided by the given learner.

14. The method of claim 11, further comprising:

determining a location of a first erroneous mathematical expression in the received solution of a given one of the learners; and sending feedback data to the given learner via the computer network, wherein the feedback includes:
  an identification of the location of the first erroneous mathematical expression in the given learner's solution; and
  explanatory text extracted from one or more different solutions provided by one or more different ones of the learners, wherein the one or more different solutions occur in a cluster of correct solutions, wherein the explanatory text has been extracted from the one or more different solutions based on the location of the first erroneous mathematical expression in the given learner's solution.

15. The method of claim 11, further comprising:

determining a location of a first erroneous mathematical expression in the received solution of a given one of the learners;

identifying one or more correct solutions from a cluster of correct solutions such that each of the one or more correct solutions shares the same mathematical expressions with the given learner's solution prior to the location of the first erroneous mathematical expression; and sending feedback data to the given learner via the computer network, wherein the feedback data includes:
  a mathematical expression extracted from a selected one of the one or more correct solutions, wherein the extracted mathematical expression has the same location in the selected solution as the location of the first erroneous mathematical expression in the given learner's solution.

16. The method of claim 11, further comprising:

receiving additional solutions from additional learners via the computer network, wherein each of the additional solutions is provided by a respective one of the additional learners;

for each of the additional received solutions, determining a corresponding feature vector based on the mathematical expressions occurring in the additional received solution;

assigning grades to the additional received solutions by performing operations including, for each of the additional received solutions, assigning a grade to the additional received solution based on the grades assigned to the representative received solutions and said $\hat{K}$ conditional probability distributions evaluated on the feature vector of the additional received solution; and storing the grades for the additional received solutions in the memory.

17. The method of claim 11, further comprising:

receiving additional solutions from additional learners via the computer network, wherein each of the additional received solutions is provided by a respective one of the additional learners;

for each of the additional received solutions, determining a corresponding feature vector based on the mathematical expressions occurring in the additional received solution;

performing the probabilistic clustering algorithm based on the feature vectors of the received solutions and the feature vectors of the additional received solutions, in order to determine:
  (c) $\Delta K$ additional probability distributions corresponding respectively to $\Delta K$ new clusters that are different from the $\hat{K}$ clusters, wherein each of the $\Delta K$ additional probability distributions characterizes a corresponding distribution of generic feature vector y given membership in a corresponding one of the $\Delta K$ new clusters; and
  (d) for each of the additional solutions, an assignment of the additional received solution to a corresponding cluster in the $\hat{K}+\Delta K$ clusters comprising the $\hat{K}$ clusters and the $\Delta K$ new clusters;

assigning grades to the additional received solutions, wherein said assigning grades to the additional received solutions includes:
  receiving additional grading input via the computer network, wherein, for each of the $\Delta K$ new clusters, the additional grading input indicates a grade to be assigned to a representative received solution from the new cluster; and
  for each of the additional received solutions other than the representative received solutions of the new clusters, assigning a grade to the additional received solution based on: the grades assigned to the representative received solutions of the $\hat{K}$ clusters and the $\Delta K$ new clusters; the $\hat{K}$ conditional probability distributions evaluated on the feature vector of the additional received solution; and $\Delta K$ additional probability distributions evaluated on the feature vector of the additional received solution; and storing the grades for the additional received solutions in the memory.

18. The method of claim 11, further comprising:

sending a message via the network to one of the learners, wherein the message includes at least the grade that has been assigned to the solution received from the learner.

* * * * *